United States Patent
Yi et al.

(10) Patent No.: US 10,708,027 B2
(45) Date of Patent: *Jul. 7, 2020

(54) METHOD AND APPARATUS FOR TRANSMITTING AND RECEIVING DATA

(71) Applicant: LG ELECTRONICS INC., Seoul (KR)

(72) Inventors: Yunjung Yi, Seoul (KR); Dongyoun Seo, Seoul (KR); Suckchel Yang, Seoul (KR); Joonkui Ahn, Seoul (KR); Inkwon Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 351 days.

This patent is subject to a terminal disclaimer.

(21) Appl. No.: 15/823,515

(22) Filed: Nov. 27, 2017

(65) Prior Publication Data

US 2018/0145813 A1 May 24, 2018

Related U.S. Application Data

(63) Continuation of application No. 14/414,872, filed as application No. PCT/KR2013/006891 on Jul. 31, 2013, now Pat. No. 9,843,429.

(Continued)

(51) Int. Cl.
*H04W 4/00* (2018.01)
*H04L 5/00* (2006.01)
(Continued)

(52) U.S. Cl.
CPC ............ *H04L 5/0053* (2013.01); *H04W 4/70* (2018.02); *H04W 76/27* (2018.02); *H04W 88/02* (2013.01)

(58) Field of Classification Search
CPC ...... H04W 72/04; H04W 88/08; H04W 76/00
See application file for complete search history.

(56) References Cited

U.S. PATENT DOCUMENTS 9,843,429 B2 12/2017 Yi et al.
2003/0152044 A1 8/2003 Turner
(Continued)

FOREIGN PATENT DOCUMENTS

| JP | 2011-512754 | 4/2011 |
| KR | 10-2010-0096035 | 9/2010 |
| KR | 10-2012-0031217 | 3/2012 |

OTHER PUBLICATIONS

United States Patent and Trademark Office U.S. Appl. No. 14/414,872, Office Action dated Apr. 15, 2016, 17 pages.
(Continued)

*Primary Examiner* — Siren Wei
(74) *Attorney, Agent, or Firm* — Lee Hong Degerman Kang & Waimey

(57) ABSTRACT

The prevent invention relates to a method and apparatus for transmitting and receiving data. The method for receiving control data by a terminal can include the steps of: a terminal receiving redundant information on a first control channel from a base station; the terminal receiving a first subframe from the base station and first blind decoding being performed on the first subframe in order to monitor the first control channel; the terminal receiving a second subframe from the base station and second blind decoding being performed on the second subframe on the basis of the redundant information and the first blind decoding information in order to monitor a second control channel.

10 Claims, 25 Drawing Sheets

Related U.S. Application Data

(60) Provisional application No. 61/678,076, filed on Jul. 31, 2012, provisional application No. 61/715,314, filed on Oct. 18, 2012.

(51) Int. Cl.
  *H04W 4/70* (2018.01)
  *H04W 76/27* (2018.01)
  *H04W 88/02* (2009.01)

(56) References Cited

U.S. PATENT DOCUMENTS

| | | |
|---|---|---|
| 2008/0057996 A1 | 3/2008 | Sung et al. |
| 2009/0088148 A1 | 4/2009 | Chung et al. |
| 2009/0257408 A1* | 10/2009 | Zhang ................. H04L 1/1621 370/336 |
| 2010/0232373 A1 | 9/2010 | Ravikiran et al. |
| 2011/0105162 A1* | 5/2011 | Kim ....................... H04L 1/001 455/500 |
| 2011/0222491 A1* | 9/2011 | Vajapeyam ........... H04L 1/0038 370/329 |
| 2013/0114572 A1* | 5/2013 | Fong ................. H04W 56/0045 370/336 |

OTHER PUBLICATIONS

United States Patent and Trademark Office U.S. Appl. No. 14/414,872, Office Action dated Oct. 6, 2016, 13 pages.

United States Patent and Trademark Office U.S. Appl. No. 14/414,872, Office Action dated Apr. 14, 2017, 14 pages.

United States Patent and Trademark Office U.S. Appl. No. 14/414,872, Notice of Allowance dated Sep. 8, 2017, 11 pages.

PCT International Application No. PCT/KR2013/006891, Written Opinion of the International Searching Authority dated Nov. 4, 2013, 1 page.

* cited by examiner

PCFICH

PHICH

PDSCH

PDCCH region

METHOD AND APPARATUS FOR TRANSMITTING AND RECEIVING DATA

CROSS-REFERENCE TO RELATED APPLICATIONS

This application is a continuation of U.S. application Ser. No. 14/414,872, filed Jan. 14, 2015, now U.S. Pat. No. 9,843,429, which is the National Stage filing under 35 U.S.C. 371 of International Application No. PCT/KR2013/006891, filed on Jul. 31, 2013, which claims the benefit of U.S. Provisional Application No. 61/678,076, filed on Jul. 31, 2012, and 61/715,314, filed on Oct. 18, 2012, the contents of which are all hereby incorporated by reference herein in their entireties.

BACKGROUND OF THE INVENTION

Field of the Invention

The disclosure relates to wireless communications, and more specifically, a method and apparatus for transmitting and receiving data.

Related Art

A major issue in the next-generation communication industry is directed towards M2M (machine to machine)/IoT (Internet of things) that provides for connection between ambient things to enable easy acquisition of necessary data anytime, anywhere and to thus allow for provision and use of various services. M2M initially began with sensor and RFID (Radio Frequency Identification) networks that primarily targeted local areas. Attention is recently shifting to mobile communication network-based M2M techniques considering mobility of things, broad service coverage including sea, as well as islands and mountain areas, easy network operation and maintenance, high-reliable security for data transmission, and quality of service (QoS).

The 3GPP, a representative European mobile communication standardization organization, started its validity research on the M2M technology back in 2005, and standardization has been actively underway since year 2008 under the title of "Machine Type Communications (MTC)."

In the 3GPP point of view, the term "machine" means an entity that does not require a direct human involvement or manipulation, and the term "MTC" is defined as a type of data communication including one or more machines.

Typical exemplary machines may include a smart meter or vending machine equipped with a mobile communication module. Another example of such type of machine is a smartphone or other portable terminal having an MTC function, which may be automatically linked to a network to perform communication without the user's manipulation or involvement depending on the user's position or circumstances. Other "machine" candidates include gateway-type MTC devices connected with tiny sensors or RFIDs based on IEEE 802.15 WPAN (Wireless Personal Area Network).

Mobile communication networks should come up with a different identifier and addressing system than the existing one in order to encompass a large number of MTC devices with low data traffic, and a new mechanism needs to be adopted for such networks in light of communication types and costs.

SUMMARY OF THE INVENTION

An object of the disclosure is to provide a data communication method.

An object of the disclosure is to provide an apparatus that performs a data communication method.

To achieve the above objects of the disclosure, according to an aspect of the disclosure, a method of receiving control data by a terminal may comprise receiving redundant information of a first control channel from a base station, by the terminal, receiving a first sub-frame from the base station, performing first blind decoding on the first sub-frame, and monitoring the first control channel, by the terminal, and receiving a second sub-frame from the base station, performing second blind decoding on the second sub-frame based on the redundant information and information on the first blind decoding, and monitoring the second control channel, by the terminal, wherein data transmitted in the second control channel includes the same data as data transmitted in the first control channel, wherein the redundant information contains information on the number of times in which the base station repetitively transmits the first control channel.

To achieve the above objects of the disclosure, according to another aspect of the disclosure, a terminal receiving control data in a wireless communication system, the terminal comprising a processor and an RF (radio frequency) unit, wherein the processor is implemented to receive redundant information of a first control channel from a base station, to receive a first sub-frame from the base station, to perform first blind decoding on the first sub-frame, and to monitor the first control channel, to receive a second sub-frame from the base station, to perform second blind decoding on the second sub-frame based on the redundant information and information on the first blind decoding, and to monitor the second control channel, wherein the RF unit is implemented to receive the first sub-frame and the second sub-frame, wherein data transmitted in the second control channel includes the same data as data transmitted in the first control channel, and wherein the redundant information contains information on the number of times in which the base station repetitively transmits the first control channel.

Data transmission coverage may be increased.

DESCRIPTION OF EXEMPLARY EMBODIMENTS

A wireless device may be stationary or mobile, and the wireless device may be referred to as a UE (User Equipment), an MS (mobile station), an MT (mobile terminal), a UT (user terminal), an SS (subscriber station), a wireless device, a PDA (personal digital assistant), a wireless modem, or a handheld device. A wireless device may be a device that supports only data communication such as an MTC (machine-type communication) device.

A base station (BS) generally denotes a fixed station that communicates with a wireless device, and the base station (BS) may be referred to as an eNB (evolved-NodeB), a BTS (Base Transceiver System), or an access point.

Hereinafter, the operation of terminals and/or base stations in 3GPP LTE (Long Term Evolution) or 3GPP LTE-A systems as defined in the 3GPP (3rd Generation Partnership Project) TS (Technical Specification) releases is described. The disclosure may also be applicable to various other wireless communication networks than 3GPP LTE/3GPP LTE-A networks. As used herein, the term "LTE" includes the terms "LTE" and/or "LTE-A."

Figure 1:
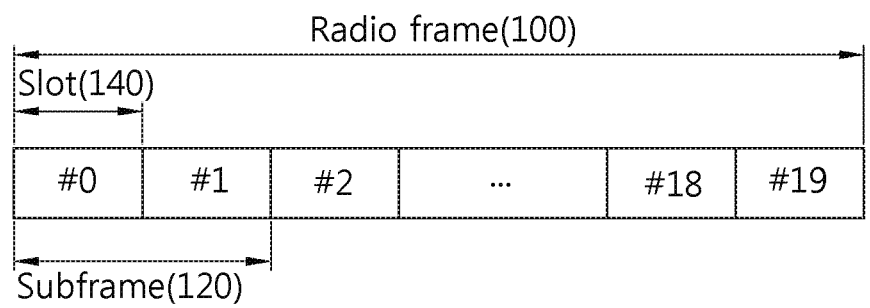
FIG. 1 illustrates the structure of an LTE radio frame.

FIG. 1 illustrates the structure of a radio frame in LTE systems.

The architecture of the radio frame 100 is set forth in 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8), Ch. 5".

Referring to FIG. 1, the radio frame 100 includes ten sub-frames 120. One sub-frame 120 includes two slots 140. The radio frame 100 may be indexed based on the slots 140 from slot #0 to slot #19, or the radio frame 100 may be indexed based on sub-frames 120 from sub-frame #0 to sub-frame #9. For example, sub-frame #0 may include slot #0 and slot #1.

The time taken for one sub-frame 120 to be transmitted may be denoted a TTI (Transmission Time Interval). The TTI may be a scheduling unit for data transmission. For example, the length of one radio frame 100 may be 10 ms, the length of one sub-frame 120 1 ms, and the length of one slot 140 0.5 ms.

One slot 140 includes a plurality of OFDM (Orthogonal Frequency Division Multiplexing) symbols in the time domain and a plurality of sub-carriers in the frequency domain. In LTE systems, a base station adopts OFDMA as a downlink channel access scheme. An OFDM symbol is for representing one symbol period, and the term "OFDM symbol" may be replaced with other terms depending on multiple access schemes. For example, SC-FDMA (single carrier-frequency division multiple access) may be used as an uplink channel multiple access scheme for transmission of data from a terminal to a base station. The symbol period where data is transmitted through an uplink channel may be denoted an SC-FDMA symbol.

The structure of the radio frame 100 shown in FIG. 1 is merely an example. The number of sub-frames 120 included in a radio frame 100, the number of slots 140 included in a sub-frame 120, or the number of OFDM symbols included in a slot 140 may be varied to define a new radio frame format.

The number of symbols included in one slot in the structure of a radio frame may be varied depending on cyclic prefixes (CPs) to be used. For example, in case a radio frame uses the normal CP, one slot may include seven OFDM symbols. In case a radio frame uses the extended CP, one slot may include six OFDM symbols.

The wireless communication system may adopt FDD (frequency division duplex) and TDD (time division duplex) as duplexing schemes. According to FDD, uplink transmission and downlink transmission may be conducted based on different frequency bands. According to TDD, uplink transmission and downlink transmission may be conducted within different time slots and the same frequency band. TDD-based channel responses may be reciprocal due to use of the same frequency band. In other words, a downlink channel response may be nearly identical to an uplink channel response in a given frequency band in the TDD scheme. Accordingly, a TDD-based wireless communication system may obtain the channel state information of a downlink channel from the channel state information of an uplink channel. In the TDD scheme, an overall frequency band is split for uplink transmission and downlink transmission, and thus, the downlink transmission by the base station cannot be simultaneously performed with the uplink transmission by the terminal.

Figure 2:
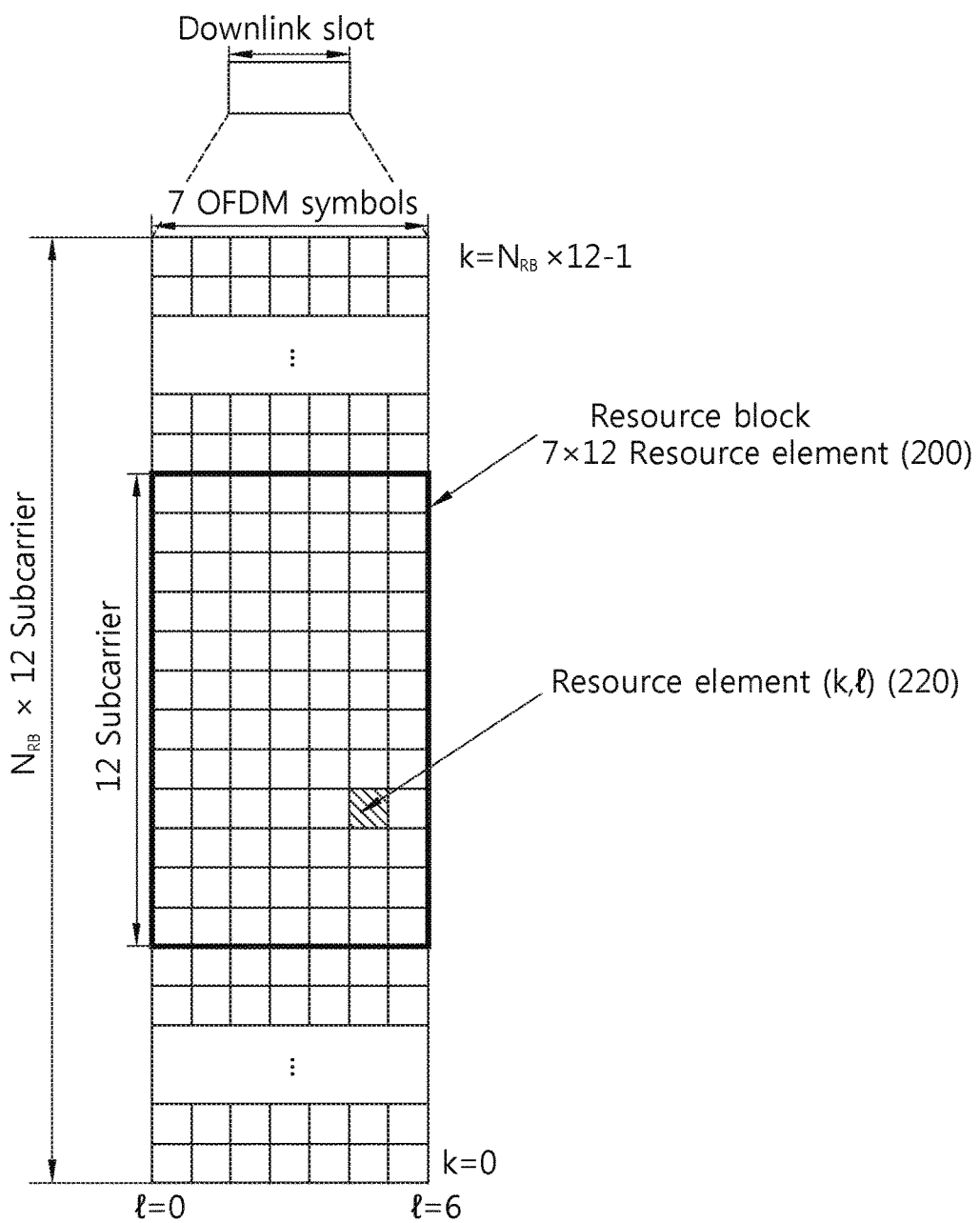
FIG. 2 illustrates an exemplary resource grid for a downlink slot.

FIG. 2 illustrates an exemplary resource grid for a downlink slot.

A downlink slot includes a plurality of OFDM symbols in the time domain and NRB resource blocks in the frequency domain. NRB, the number of resource blocks included in a downlink slot, may be determined depending on downlink transmission bandwidths set in a cell. For example, in LTE systems, NRB may be any one in a range from 6 to 110 depending on bandwidths used. One resource block 200 may include a plurality of sub-carriers in the frequency domain. The uplink slot may be identical in structure to the downlink slot.

Each element in the resource grid is denoted a resource element 220. Each resource element 220 in the resource grid may be identified by an index pair (k,l). Here, k is an index of a sub-carrier in the frequency domain (k=0, . . . , NRB×12−1), and l is an index of an OFDM symbol in the time domain (l=0, . . . , 6).

Here, one resource block 200 may include 7×12 resource elements 220 that include seven OFDM symbols in the time domain and 12 sub-carriers in the frequency domain. The size is merely an example, and the number of OFDM symbols and the sub-carriers constituting one resource block 200 may be varied. A resource block pair indicates a resource unit that includes two resource blocks.

The number of OFDM symbols included in one slot may be varied depending on CPs as described above. Further, the number of resource blocks included in one slot may be varied depending on the size of an overall frequency bandwidth.

Figure 3:
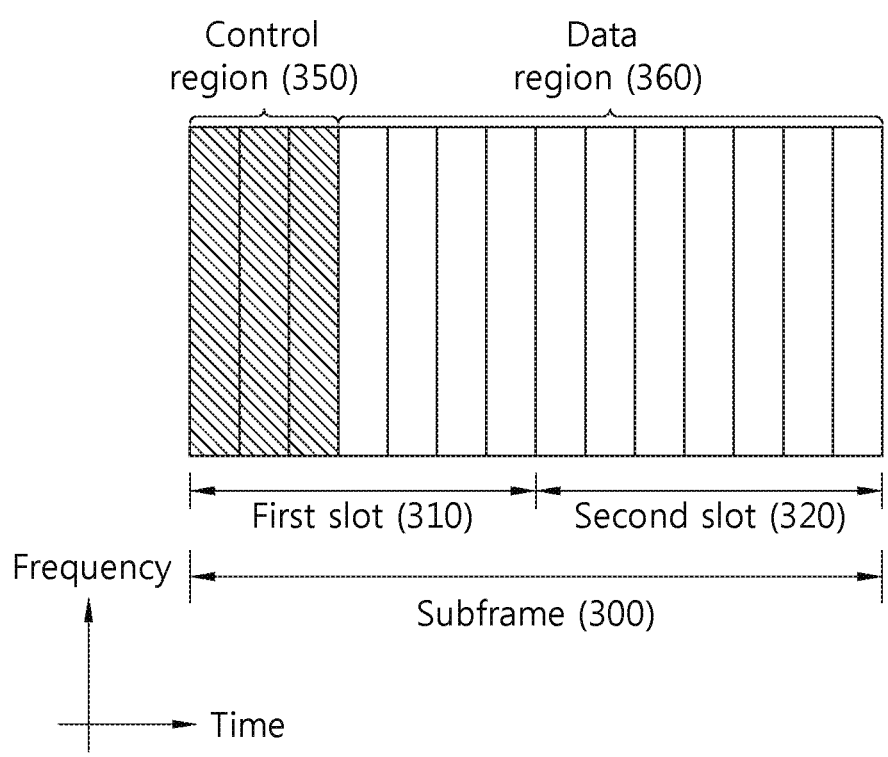
FIG. 3 illustrates the structure of a downlink sub-frame.

FIG. 3 illustrates the structure of a downlink sub-frame.

A downlink sub-frame 300 may be divided into two slots 310 and 320 along a time axis. Each slot 310 and 320 includes seven OFDM symbols in the normal CP. The resource region corresponding to first OFDM symbols (up to four OFDM symbols in a 1.4 MHz bandwidth) along the time axis, which are included in the first slot 310, may be used as a control region 350 where control channels are allocated. The remaining OFDM symbols may be used as a data region 360 where traffic channels such as PDSCH (physical downlink shared channel) are allocated.

The PDCCH may be a control channel for transmitting information regarding, e.g., DL-SCH (downlink-shared channel) resource allocation and transmission format, UL-SCH (uplink-shared channel) resource allocation, paging over PCH, system information on DL-SCH, resource allocation for higher layer control message such as random access response transmitted over PDSCH, set of transmission power control commands for individual UEs in any UE group, and activation of VoIP (Voice over Internet Protocol). A plurality of units for transmission of PDCCH data may be defined in the control region 350. The terminal may monitor the plurality of units for transmission of PDCCH data to obtain control data. For example, the PDCCH data may be transmitted to the terminal based on one or aggregation of some consecutive CCEs (control channel elements). A CCE may be a unit for transmission of PDCCH data. A CCE may include a plurality of resource element groups. A resource element group is a resource unit including four available resource elements.

The base station determines a PDCCH format depending on DCI (downlink control information) to be sent to the terminal, and the base station adds a CRC (cyclic redundancy check) to the control information. The CRC is masked with a unique identifier (RNTI; radio network temporary identifier) depending on the owner or purpose of the PDCCH. In the case of a PDCCH for a particular terminal, the unique identifier of the terminal, e.g., C-RNTI (cell-RNTI), may be masked to the CRC. In the case of a PDCCH for a paging message, a paging indication identifier, e.g., P-RNTI (paging-RNTI), may be masked to the CRC. In the case of a PDCCH for a system information block (SIB), a system information identifier, e.g., SI-RNTI (system information-RNTI), may be masked to the CRC. In order to indicate a random access response, which is a response to transmission of a random access preamble from the terminal, an RA-RNTI (random access-RNTI) may be masked to the CRC.

Figure 4:
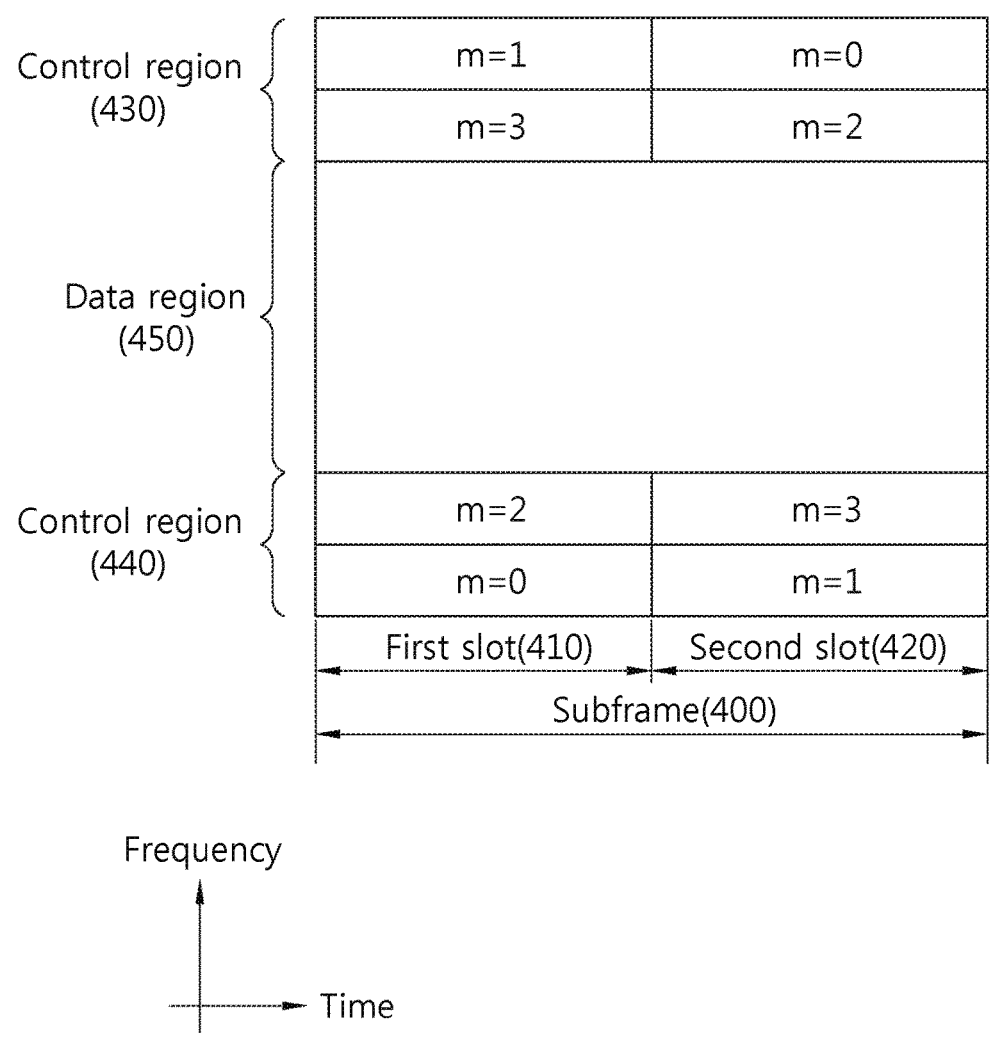
FIG. 4 illustrates the structure of an uplink sub-frame.

FIG. 4 illustrates the structure of an uplink sub-frame.

An uplink sub-frame may be divided into control regions 430 and 440 and a data region 450 in the frequency domain. The control regions 430 and 440 are allocated with a PUCCH (physical uplink control channel) for transmission of uplink control information. The data region 450 may be allocated with a PUSCH (physical uplink shared channel) for transmission of data. When indicated by a higher layer, the terminal may support simultaneous transmission of the PUSCH and the PUCCH.

The PUCCH for one terminal may be allocated in units of RB pairs in the sub-frame 400. The resource blocks in the resource block pair may be allocated to different sub-carriers in each of the first slot 410 and the second slot 420. The number of frequencies occupied by the resource blocks in the resource block pair, which are allocated to the PUCCH, are varied with respect to a slot boundary. Such PUCCH allocation scheme is referred to as a frequency-hopped method. The terminal may obtain a frequency diversity gain by transmitting the uplink control information through different sub-carriers depending on times. m is a location index indicating a logical frequency region location of a resource block pair allocated to the PUCCH in the sub-frame.

The uplink control information transmitted over the PUCCH may include an HARQ (hybrid automatic repeat request), an ACK (acknowledgement)/NACK (non-acknowledgement), a CQI (channel quality indicator) indicating a downlink channel state, and an SR (scheduling request) that is a request for allocating an uplink radio resource.

The PUSCH is a channel mapped to an UL-SCH (uplink shared channel) that is a transport channel. The uplink data transmitted over the PUSCH may be a transform block that is a data block of the UL-SCH transmitted during a TTI. The transport block may include user information. Further, the uplink data may be multiplexed data. The multiplexed data is data obtained by multiplexing the transport block for UL-SCH and control information. For example, the control information multiplexed with the data may include a CQI, a PMI (precoding matrix indicator), an HARQ, and an RI (rank indicator). Or, the uplink data may include control information only.

Figure 5:
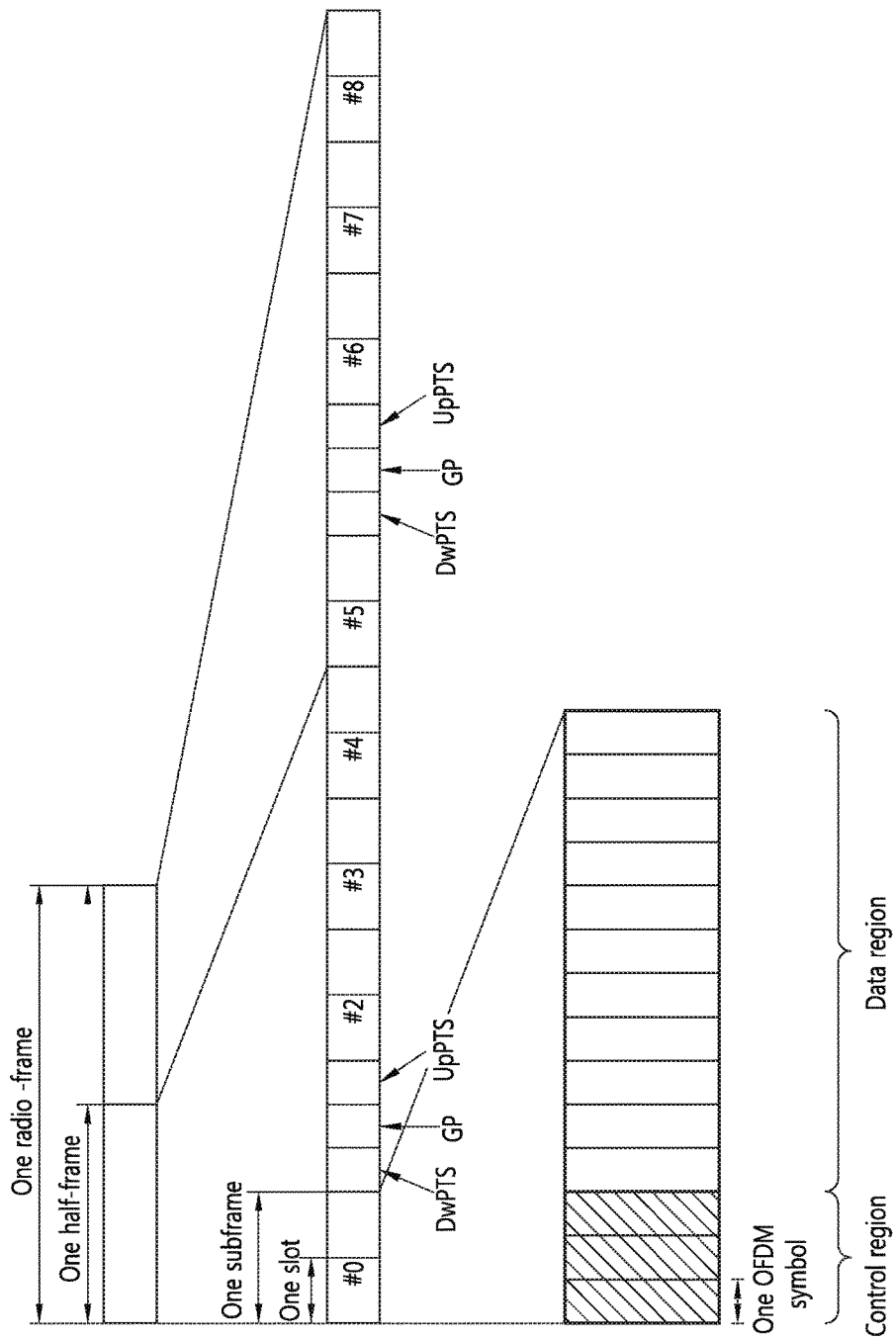
FIG. 5 illustrates the structure of a TDD mode radio frame.

FIG. 5 illustrates the structure of a TDD mode radio frame.

For TDD mode radio frames, refer to 3GPP TS 36.211 V8.7.0 (2009-05) "Evolved Universal Terrestrial Radio Access (E-UTRA); Physical Channels and Modulation (Release 8), Ch. 4."

Sub-frames having indexes #1 and #6 are called special sub-frames, and the sub-frames include a DwPTS (Downlink Pilot Time Slot), a GP (Guard Period), and an UpPTS (Uplink Pilot Time Slot). The DwPTS is used for initial cell detection, synchronization, or channel estimation by the terminal. The UpPTS is used for channel estimation by the base station and sync in uplink transmission between the terminal and the terminal. The GP is a section for removing interference that occurs in the uplink due to a multi-path delay of a downlink signal between the uplink and the downlink.

In TDD systems, a DL (downlink) sub-frame and a UL (uplink) sub-frame co-exist in one radio frame. Table 1 shows an exemplary configuration of a radio frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' refers to a DL sub-frame, 'U' a UL sub-frame, and 'S' a special sub-frame. When receiving the UL-DL configuration from the base station, the terminal may be aware of whether a sub-frame is a DL sub-frame or a UL sub-frame depending on the radio frame configuration.

The DL sub-frame is divided into a control region and a data region in the time domain. The control region includes up to first three OFDM symbols in the first slot in the sub-frame. However, the number of OFDM symbols included in the control region may be varied. The control region is allocated with a PDCCH and other control channels, and the data region is allocated with a PDSCH.

Figure 6:
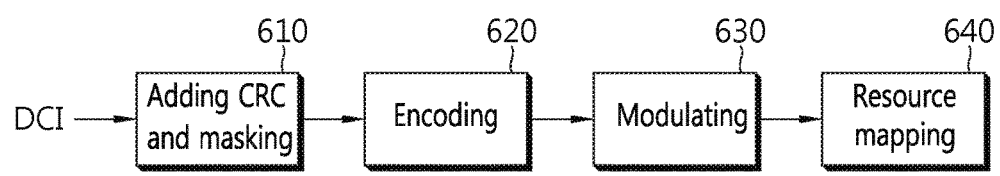
FIG. 6 is a block diagram illustrating a method for generating PDCCH data.

FIG. 6 is a block diagram illustrating a method for generating PDCCH data.

FIG. 6 specifically discloses a method of generating PDCCH data.

The terminal performs blind decoding for detection of a PDCCH. The blind decoding may be conducted based on the identifier masked to the CRC of the received PDCCH (which is called a candidate PDCCH). The terminal checks the received PDCCH data for CRC errors to identify whether the received PDCCH data is the terminal's control data.

The base station determines a PDCCH format depending on DCI (downlink control information) to be sent to the terminal, adds a CRC (Cyclic Redundancy Check) to the DCI, and masks the CRC with a unique identifier (which is called an RNTI (Radio Network Temporary Identifier) according to the owner or purpose of the PDCCH) (block 610).

In the case of a PDCCH for a particular terminal, the base station may mask the CRC with the unique identifier of the terminal, e.g., C-RNTI (cell-RNTI). In the case of a PDCCH for a paging message, the base station may mask the CRC with a paging indication identifier, e.g., P-RNTI (paging-RNTI). In the case of a PDCCH for system information, the base station may mask the CRC with a system information identifier, e.g., an SI-RNTI (system information-RNTI). Further, the base station may mask the CRC with an RA-RNTI (random access-RNTI) for indicating a random access response, which is a response to transmission of a random access preamble, or the base station may mask the CRC with a TPC-RNTI for indicating a TPC (transmit power control) command for a plurality of terminals.

The C-RNTI-masked PDCCH may transmit the control information for a corresponding specific terminal (this is called UE-specific control information), and the PDCCH masked with other RNTI may transmit common control information that is transmitted by all or multiple terminals in a cell. A plurality of DCI formats may be defined to transmit PDCCH data. This is further described below in detail.

The base station encodes a CRC-added DCI to generate coded data (block 620). The encoding includes channel encoding and rate matching.

The base station modulates the coded data to generate modulated symbols (block 630).

The base station maps the modulated symbols to physical REs (resource elements) (block 640). The base station may map the modulated symbols to the resource elements REs, respectively.

As described above, the control region in the sub-frame includes a plurality of CCEs (control channel elements). A CCE is a logical unit of allocation, which is used to provide a PDCCH with a coding rate depending on the state of a radio channel, and the CCE corresponds to a plurality of REGs (resource element groups). An REG includes a plurality of resource elements. One REG includes four REs, and one CCE includes nine REGs. In order to configure one PDCCH, one, two, four, or eight CCEs may be used, and aggregation of one, two, four, or eight CCEs is referred to as a CCE aggregation level.

The base station may determine the number of CCEs to be used for PDCCH transmission depending on channel states. For example, in the case of a good downlink channel state, the base station may use one CCE to transmit PDCCH data to the terminal. In contrast, in the case of a poor downlink channel state, the base station may use eight CCEs to transmit PDCCH data to the terminal.

The control channel configured of one or more CCEs may be subjected to interleaving in units of REGs, followed by cell ID (identifier)-based cyclic shift, and the resultant channel may be mapped to a physical resource.

Figure 7:
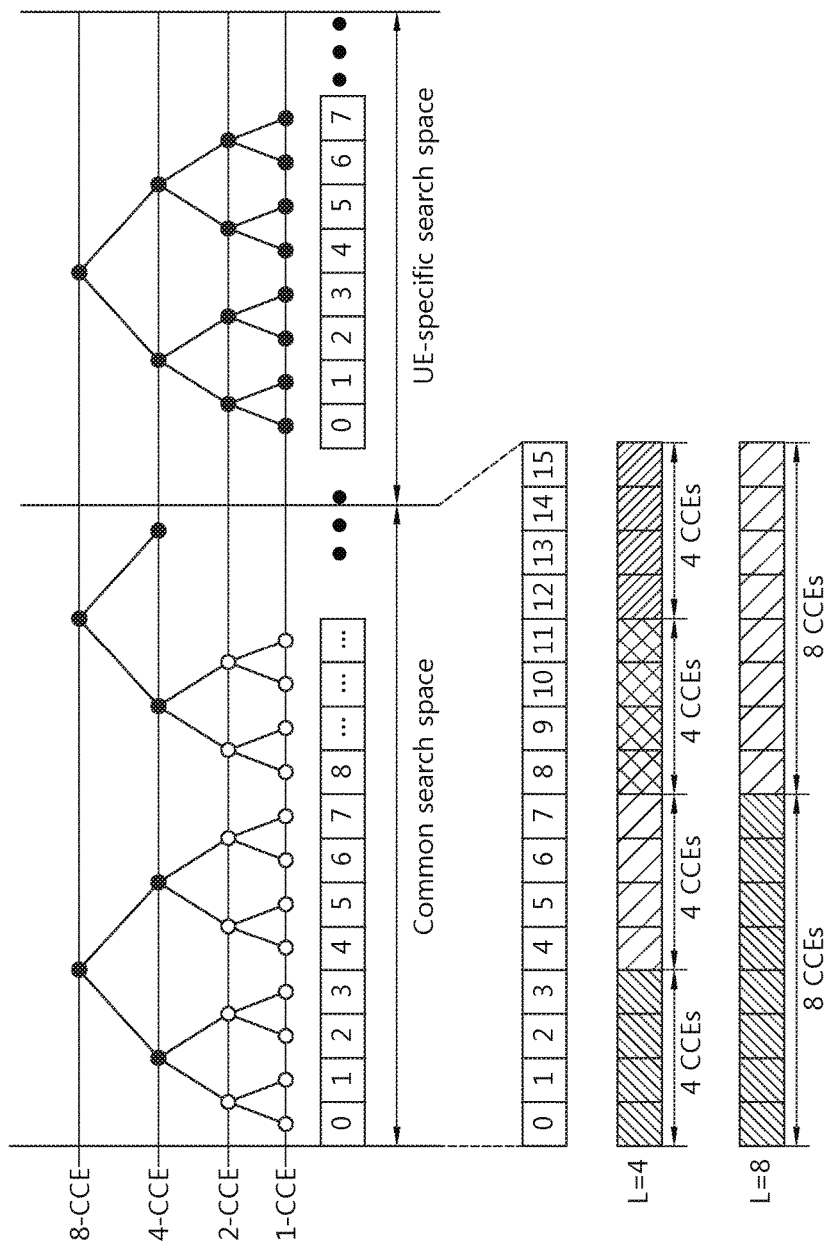
FIG. 7 is a view illustrating an example of PDCCH monitoring.

FIG. 7 is a view illustrating an example of PDCCH monitoring.

For a PDCCH monitoring procedure, refer to 3GPP TS 36.213 V10.2.0 (2011-06), Ch. 9.

The terminal may perform blind decoding for detection of a PDCCH. The blind decoding is a scheme for demasking the CRC of received PDCCH (which is called a PDCCH candidate) data based on a specific identifier, checking CRC errors, and identifying whether the PDCCH is the control channel of the terminal. The terminal is not aware of the position where its PDCCH data is transmitted in the control region and the CCE aggregation level and DCI format to be used for transmission.

A plurality of PDCCHs may be transmitted in one sub-frame. The terminal monitors a plurality of PDCCHs in each sub-frame. Here, the term "monitoring" refers to the terminal attempting to do blind decoding on a PDCCH.

In 3GPP LTE systems, the terminal uses a search space in order to reduce load that may occur when the terminal performs blind decoding. The search space may be a monitoring set of CCEs for searching for a PDCCH. The terminal may monitor a PDCCH based on the search space.

Search spaces may include a common search space and a UE-specific search space. The common search space is a space for searching a PDCCH having common control information, and the common search space includes 16 CCEs from CCE index 0 to CCE index 15, and the common search space supports PDCCHs having CCE aggregation levels {4, 8}. However, PDCCH data (DCI formats 0 and 1A) carrying UE-specific information may be transmitted in the common search space. The terminal-specific SRS supports PDCCHs having CCE aggregation levels {1, 2, 4, 8}.

The following Table 2 represents the number of PDCCH candidates monitored by the terminal.

TABLE 2

| Type | Search space $S_k^{(L)}$ Aggregation level L | Size [in CCEs] | Number of PDCCH candidates $M^{(L)}$ | DCI format |
|---|---|---|---|---|
| UE-specific | 1 | 6 | 6 | 0, 1, 1A, 1B, |
|  | 2 | 12 | 6 | 1D, 2, 2A |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of a search space is determined as shown in Table 2 above, and the start point of a search space differs depending on whether the search space is a common search space or a terminal-specific SRS. The start point of a common search space may be fixed regardless of sub-frames, but the start point of a terminal-specific SRS may be varied for each sub-frame depending on terminal identifiers (e.g., C-RNTI), CCE aggregation levels, and/or slot numbers in a radio frame. In case the start point of a UE-specific search space is within a common search space, the terminal-specific SRS and the common search space may overlap each other.

A set of PDCCH candidates monitored by the terminal may be defined with respect to a search space. In aggregation level 1, 2, 4, or 8, a search space $S_k^{(L)}$ is defined as a set of PDCCH candidates. In a search space $S_k^{(L)}$, a CCE corresponding to PDCCH candidate m is given as in the following Equation 1:

$$L \cdot \{(Y_k + m') \bmod \lfloor N_{CCE,k}/L \rfloor\} + i \qquad \text{<Equation 1>}$$

Here, i=0, . . . , L−1. In the case of a common search space, m'=m. In the case of a terminal-specific search space, if a CIF (carrier indicator field) is set in the terminal, $m' = m + M^{(L)} \cdot n_{CI}$, where $n_{CI}$ is a preset CIF value, and otherwise, m'=m. Here, m=0, . . . , $M^{(L)}$−1, and $M^{(L)}$ is the number of PDCCH candidates for monitoring a given search space.

In a common search space, $Y_k$ is set to 0 for two aggregation levels L=4 and L=8. In the terminal-specific SRS of aggregation level L, variable Y k is defined as in the following Equation 2:

$$Y_k = (A \cdot Y_{k-1}) \bmod D \qquad \text{<Equation 2>}$$

Here, $Y_{-1} = n_{RNTI} \neq 0$, A=39827, D=65537, $k = \lfloor n_s/2 \rfloor$, A=39827, D=65537, $k = \lfloor n_s/2 \rfloor$. $n_s$ is a slot number in the radio frame.

When the wireless device monitors a PDCCH based on a C-RNTI, the DCI format and search space to be monitored are determined depending on transmission modes of the PDSCH. The following table represents an example of monitoring a C-RNTI-configured PDCCH.

TABLE 3

| Transmission mode | DCI format | Search space | PDSCH transmission mode according to PDCCH |
|---|---|---|---|
| Mode 1 | DCI format 1A | Common and UE-specific | Single antenna port, port 0 |
|  | DCI format 1 | UE-specific | Single antenna port, port 0 |
| Mode 2 | DCI format 1A | Common and UE-specific | Transmission diversity |
|  | DCI format 1 | UE-specific | Transmission diversity |

TABLE 3-continued

| Transmission mode | DCI format | Search space | PDSCH transmission mode according to PDCCH |
|---|---|---|---|
| Mode 3 | DCI format 1A | Common and UE-specific | Transmission diversity |
|  | DCI format 2A | UE-specific | Cyclic Delay Diversity (CDD) or transmission diversity |
| Mode 4 | DCI format 1A | Common and UE-specific | Transmission diversity |
|  | DCI format 2 | UE-specific | Closed-loop spatial multiplexing |
| Mode 5 | DCI format 1A | Common and UE-specific | Transmission diversity |
|  | DCI format 1D | UE-specific | Multi-user Multiple Input Multiple Output (MU-MIMO) |
| Mode 6 | DCI format 1A | Common and UE-specific | Transmission diversity |
|  | DCI format 1B | UE-specific | Closed-loop spatial multiplexing |
| Mode 7 | DCI format 1A | Common and UE-specific | If the number of PBCH transmission port is 1, single antenna port, port 0, otherwise, transmission diversity |
|  | DCI format 1 | UE-specific | Single antenna port, port 5 |
| Mode 8 | DCI format 1A | Common and UE-specific | If the number of PBCH transmission port is 1, single antenna port, port 0, otherwise, transmission diversity |
|  | DCI format 2B | UE-specific | Dual layer transmission (port 7 or 8), or single antenna port, port 7 or 8 |

The purposes of the DCI format are classified as follows:

TABLE 4

| DCI format | Contents |
|---|---|
| DCI format 0 | Used for PUSCH scheduling |
| DCI format 1 | Used for one PDSCH codeword scheduling |
| DCI format 1A | Used for one PDSCH codeword compact scheduling and random access procedure |
| DCI format 1B | Used for one PDSCH codeword compact scheduling that has pre-coding information |
| DCI format 1C | Used for very compact scheduling of one DSCH codeword |
| DCI format 1D | Used for one PDSCH codeword compact scheduling that has pre-coding and power offset information |
| DCI format 2 | Used for PDSCH scheduling of the UEs that are configured in closed-loop spatial multiplexing mode |
| DCI format 2A | Used for PDSCH scheduling of the UEs that are configured in open-loop spatial multiplexing mode |
| DCI format 3 | Used for TPC command transmission of PUCCH that has 2 bit power adjustments and PUSCH |
| DCI format 3A | Used for TPC command transmission of PUCCH that has 1 bit power adjustments and PUSCH |

The DCI format and search space used may be varied depending on the RNTIs masked to the CRC used upon generation of the DCI. The following Table 5 represents the search spaces and DCI formats of control channels used when an SI-RNTI, P-RNTI, or RA-RNTI is masked to the CRC of a DCI.

TABLE 5

| DCI format | Search space | PDSCH transmission mode according to PDCCH |
|---|---|---|
| DCI format 1C | Common | If the number of PBCH transmission port is 1, single antenna port, port 0, otherwise, transmission diversity |
| DCI format 1A | Common | If the number of PBCH transmission port is 1, single antenna port, port 0, otherwise, transmission diversity |

The following Table 6 represents the search spaces and DCI formats of control channels used when an SPS-C-RNTI is masked to the CRC of a DCI.

TABLE 6

| Transmission mode | DCI format | Search space | PDSCH transmission mode according to PDCCH |
|---|---|---|---|
| Mode 1 | DCI format 1A | Common and UE-specific | Single antenna port, port 0 |
|  | DCI format 1 | UE-specific | Single antenna port, port 0 |
| Mode 2 | DCI format 1A | Common and UE-specific | Transmission diversity |
|  | DCI format 1 | UE-specific | Transmission diversity |
| Mode 3 | DCI format 1A | Common and UE-specific | Transmission diversity |
|  | DCI format 2A | UE-specific | Transmission diversity |
| Mode 4 | DCI format 1A | Common and UE-specific | Transmission diversity |
|  | DCI format 2 | UE-specific | Transmission diversity |
| Mode 5 | DCI format 1A | Common and UE-specific | Transmission diversity |
| Mode 6 | DCI format 1A | Common and UE-specific | Transmission diversity |
| Mode 7 | DCI format 1A | Common and UE-specific | Single antenna port, port 5 |
|  | DCI format 1 | UE-specific | Single antenna port, port 5 |
| Mode 8 | DCI format 1A | Common and UE-specific | Single antenna port, port 7 |
|  | DCI format 2B | UE-specific | Single antenna port, port 7 or 8 |
| Mode 9 | DCI format 1A | Common and UE-specific | Single antenna port, port 7 |
|  | DCI format 2C | UE-specific | Single antenna port, port 7 or 8 |
| Mode 10 | DCI format 1A | Common and UE-specific | Single antenna port, port 7 |
|  | DCI format 2D | UE-specific | Single antenna port, port 7 or 8 |

The following Table 7 represents the search spaces and DCI formats of control channels used when a temporary C-RNTI is masked to the CRC of a DCI.

TABLE 7

| DCI format | Search space | PDSCH transmission mode according to PDCCH |
|---|---|---|
| DCI format 1A | Common and UE-specific | If the number of PBCH transmission port is 1, single antenna port, port 0, otherwise, transmission diversity |
| DCI format 1 | UE-specific | If the number of PBCH transmission port is 1, single antenna port, port 0, otherwise, transmission diversity |

Figure 8:
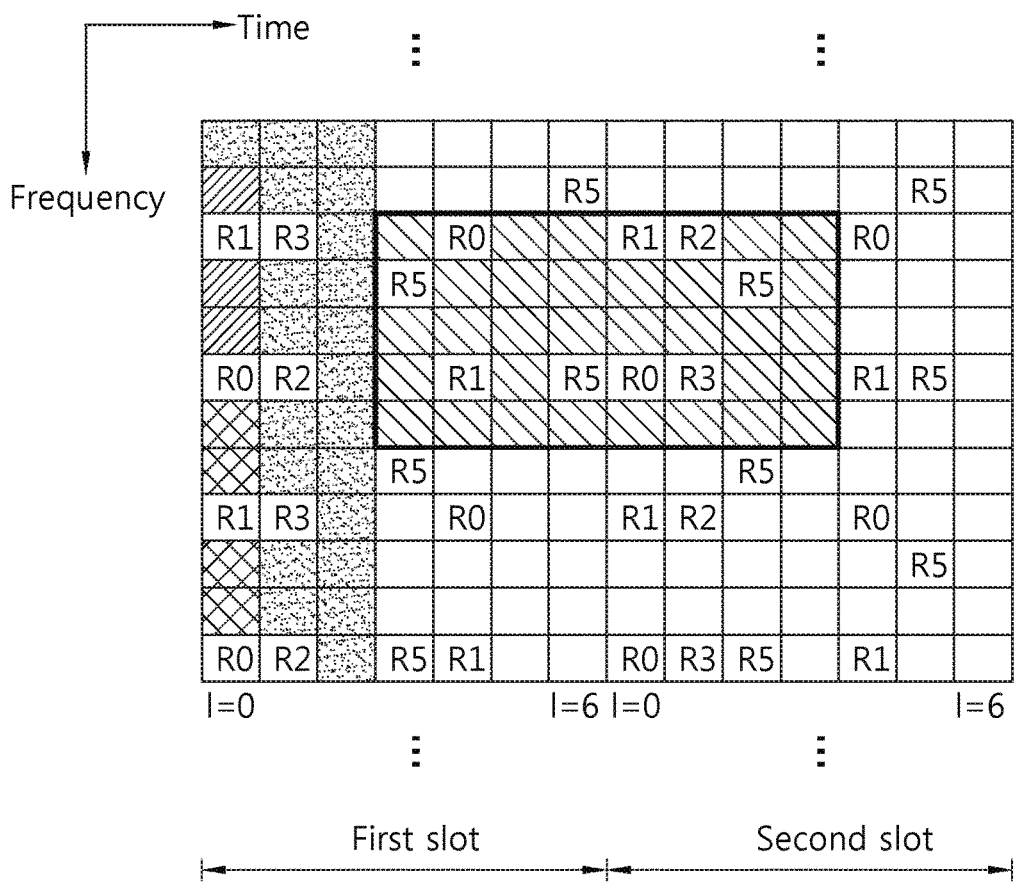
FIG. 8 illustrates a downlink sub-frame allocated with a control channel and a 3GPP LTE reference signal.
Figure 8:
Figure 8:
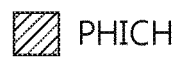
Figure 8:
Figure 8:

FIG. 8 illustrates a downlink sub-frame allocated with a control channel and a 3GPP LTE reference signal.

The downlink sub-frame may be divided into a control region and a data region. For example, the control region (or PDCCH region) of the downlink sub-frame includes three first OFDM symbols, and the data region where a PDSCH is transmitted includes the remaining three OFDM symbols.

A PCFICH, a PHICH, and/or a PDCCH are transmitted in the control region.

The PHICH (physical HARQ ACK/NACK indicator channel) may transmit HARQ (hybrid automatic retransmission request) information in response to uplink transmission.

The PCFICH (physical control format indicator channel) may transmit information on the number of OFDM symbols allocated to the PDCCH. For example, the PCFICH CFI (control format indicator) may indicate three OFDM symbols. The region except the resource where the PCFICH and/or PHICH are transmitted in the control region is a PDCCH region where the terminal monitors the PDCCH.

Other various reference signals may be transmitted in the sub-frame.

A CRS (cell-specific reference signal) is a reference signal that may be received by all the terminals in a cell, and the CRS may be transmitted over an entire downlink frequency band. As shown in FIG. 6, 'R0' indicates an RE where a CRS for a first antenna port is transmitted, 'R1' an RE where a CRS for a second antenna port is transmitted, 'R2' an RE where a CRS for a third antenna port is transmitted, and 'R3' an RE where a CRS for a fourth antenna port is transmitted.

An RS sequence $r_{l,n_s}(m)$ for a CRS is defined as follows:

$$r_{l,ns}(m) = \frac{1}{\sqrt{2}}(1 - 2 \cdot c(2m)) + j\frac{1}{\sqrt{2}}(1 - 2 \cdot c(2m+1)) \qquad \langle \text{Equation 3} \rangle$$

Here, m=0, 1, . . . , $2 N_{RB}^{max,DL}-1$, $N_{RB}^{max,DL}$ is the maximum number of RBs, ns is a slot number in the radio frame, and l is an OFDM symbol index in a slot.

Pseudo-random sequence c(i) is defined by a gold sequence whose length is 31 as follows:

$c(n) = (x_1(n+Nc) + x_2(n+Nc))$ mod 2

$x_1(n+31) = (x_1(n+3) + x_1(n))$ mod 2

$x_2(n+31) = (x_2(n+3) + x_2(n+2) + x_2(n+1) + x_2(n))$ mod 2     <Equation 4>

Here, Nc=1,600, and the first m-sequence is initialized as x1(0)=1, x1(n)=0, m=1, 2, . . . , 30. The second m-sequence is initialized as $c_{init} = (\lfloor n_s/2 + 1 \rfloor \cdot (2N_{ID}^{cell}+1) \cdot 2^{16} + n_{RNTI}$ at the start of each OFDM symbol. $N_{ID}^{cell}$ is a PCI (physical cell identifier) of the cell. For the normal CP, $N_{CP}=1$, and for the extended CP, $N_{CP}=0$.

Further, a URS (UE-specific reference signal) may be transmitted in the sub-frame. While a CRS is transmitted in an overall sub-frame, a URS is transmitted in the data region of a sub-frame. The URS is a reference signal used for demodulating a PDSCH. In FIG. 7, 'R5' refers to an RE where a URS is transmitted. A DM-RS is a reference signal used for demodulating ePDCCH data.

PDSCH data corresponding to a URS may be transmitted in a resource-mapped RB. In FIG. 7 R5's are marked off the region where PDSCH data is transmitted in order to indicate the positions of REs to which the URSs are mapped.

A URS may be a reference signal demodulated only by a specific terminal. An RS sequence for URSs, rl,ns (m) is the same as Equation 3. In this case, m=0, 1, . . . , $12N_{RB}^{PDSCH}-1$, and $N_{RB}^{PDSCH}$ is the number of RBs used for transmission of a corresponding PDSCH. In case a URS is transmitted through a single antenna, a pseudo random sequence generator is initialized as $c_{init} = (\lfloor n_s/2+1 \rfloor \cdot (2N_{ID}^{cell}+1) \cdot 2^{16} + n_{RNTI}$ at the start of each sub-frame. $n_{RNTI}$ is an identifier of the wireless device.

The above-described initialization method is for the cases where a URS is transmitted through a single antenna. When a URS is transmitted through multiple antennas, the pseudo random sequence generator is initialized as $c_{init}=(\lfloor n_s/2 \rfloor+1) \cdot (2n_{ID}^{(n_{SCID})}+1) \cdot 2^{16}+n_{SCID}$ at the start of each sub-frame. $n_{SCID}$ is a parameter obtained from a DL grant (e.g., DCI format 2B or 2C) related to PDSCH transmission.

A URS supports MIMO (Multiple Input Multiple Output) transmission. An RS sequence for a URS may be spread in the following spread sequence depending on antenna ports or layers.

TABLE 8

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path input to a precoder. A rank may be the number of non-zero eigenvalues of an MIMO channel matrix, and the rank is the same as the number of layers or spatial streams. A layer may correspond to a spread sequence that applies to a URS and/or an antenna port for distinguishing URSs.

Meanwhile, a PDCCH is monitored in a limited region, e.g., control region, of a sub-frame, and demodulation of a PDCCH uses a CRS that is transmitted in an overall band. Diversified control data types and increased control data reduce the flexibility in scheduling using the PDCCHs alone. To address this issue and to reduce overhead that occurs due to transmission of CRSs, ePDCCHs (enhanced PDCCHs) have been adopted.

Figure 9:
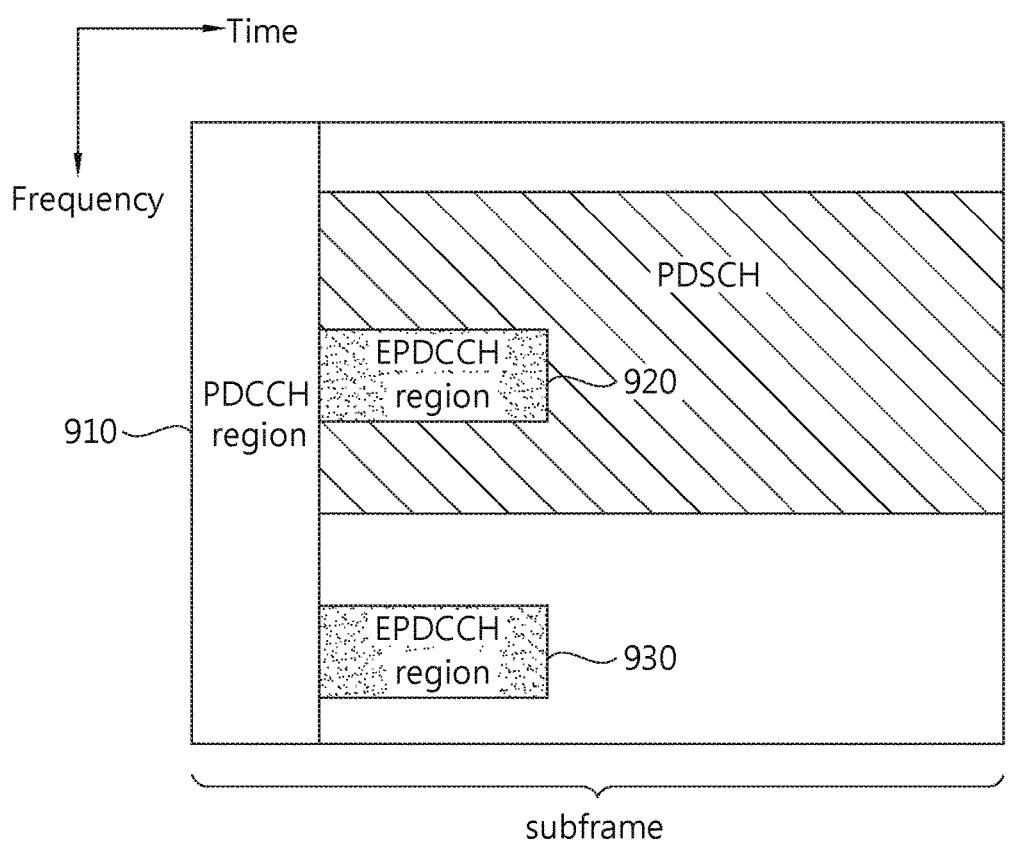
FIG. 9 illustrates an exemplary sub-frame having an ePDCCH.

FIG. 9 illustrates an exemplary sub-frame having an ePDCCH.

A sub-frame may include zero or one PDCCH region 910 and zero or more ePDCCH regions 920 and 930.

The ePDCCH regions 920 and 930 are regions where the terminal monitors ePDCCHs. The PDCCH region 810 is positioned at first three or up to first four OFDM symbols in a sub-frame, and the ePDCCH regions 920 and 930 may be flexibly scheduled at OFDM symbols behind the PDCCH region 910.

One or more ePDCCH regions 920 and 930 may be designated in the terminal, and the terminal may monitor ePDCCH data in the designated ePDCCH regions 920 and 930.

The number/position/size of the ePDCCH regions 920 and 930, and/or information regarding a sub-frame to monitor the ePDCCHs may be informed by the base station to the terminal through, e.g., an RRC (radio resource control) message.

In the PDCCH region 910, the PDCCH may be demodulated based on a CRS. In the ePDCCH regions 920 and 930, a DM-RS, not a CRS, may be defined for demodulation of the ePDCCHs. The DM-RS may be transmitted in its corresponding ePDCCH region 920 and 930.

An RS sequence for the DM-RS is the same as shown in Equation 3. In this case, m=0, 1, . . . , $12N_{RB}^{max,DL}$, and $N_{RB}^{max,DL}$ is the maximum number of RBs. The pseudo-random sequence generator may be initialized as $c_{init}=(\lfloor n_s/2 \rfloor+1) \cdot (2n_{ID,i}^{EPDCCH}+1) \cdot 2^{16}+n_{SCID}^{EPDCCH}$ at the start of each sub-frame. ns is a slot number in the radio frame, $n_{ID,i}^{EPDCCH}$ is a cell index related to a corresponding ePDCCH region, and $n_{SCID}^{EPDCCH}$ is a parameter given from a higher layer signaling.

Each ePDCCH region 920 and 930 may be used in scheduling for different cells. For example, the ePDCCH in the ePDCCH region 920 may carry scheduling information for a primary cell, and the ePDCCH in the ePDCCH region 930 may carry scheduling information for a secondary cell.

When the ePDCCHs in the ePDCCH regions 920 and 930 are transmitted through multiple antennas, the DM-RSs in the ePDCCH regions 920 and 930 may be subjected to the same precoding as the ePDCCHs.

As compared with PDCCHs that adopt CCEs as their units for transmission, ePDCCHs use ECCEs (Enhanced Control Channel Elements) as their units for transmission. Aggregation levels may be defined in units of resources to monitor ePDCCHs. For example, assuming that one ECCE is a minimum resource for an ePDCCH, aggregation levels L={1, 2, 4, 8, 16} may be defined. Also in the ePDCCH regions, search spaces may be defined. The terminal may monitor ePDCCH candidates based on aggregation levels.

Figure 10:
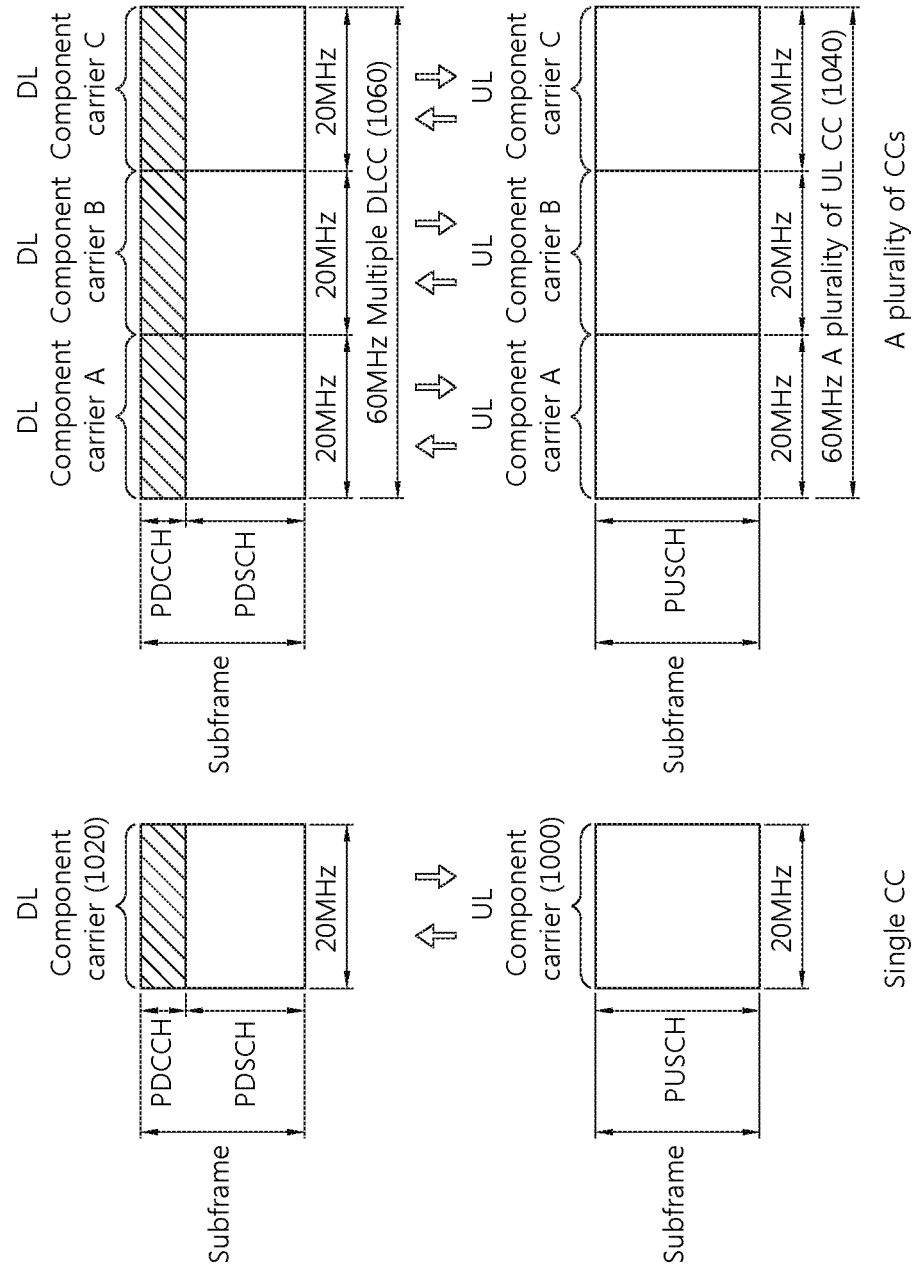
FIG. 10 is a concept view illustrating carrier aggregation.

FIG. 10 is a concept view illustrating carrier aggregation.

FIG. 10(A) illustrates a single CC (component carrier). One CC may be a 20 MHz uplink frequency band 1000 and downlink frequency band 1020. FIG. 10(B) illustrates multiple CCs. The multiple CCs may be a 60 MHz uplink frequency band 940 and downlink frequency band 1060 that is obtained by aggregating, e.g., 20 MHz uplink frequency bands and downlink frequency bands.

The base station may conduct aggregation, and the base station may transmit data to the terminal through a plurality of downlink CCs. The base station may perform downlink transmission using N downlink CCs. In this case, if the terminal may receive downlink data only through M (M is a natural number equal to or smaller than N) downlink CCs, the terminal may receive only downlink data transmitted through the M downlink CCs from the base station.

Additionally, the base station may configure a frequency bandwidth corresponding to L (L is a natural number equal to or smaller than M and N) downlink CCs as its main CC and the base station may operate the main CC. The terminal may first monitor and receive the data transmitted from the base station through the main CC. In case carrier aggregation is conducted, CCs may be classified depending on cells.

In case carrier aggregation is fulfilled using CCs of a P-cell (primary cell) and an S-cell (secondary cell), among the carriers used for downlink and uplink, carriers corresponding to the CCs of the P-cell are referred to as PCCs (primary cell component carriers), and carriers corresponding to the CCs of the S-cell are referred to as SCCs (secondary component carriers).

Figure 11:
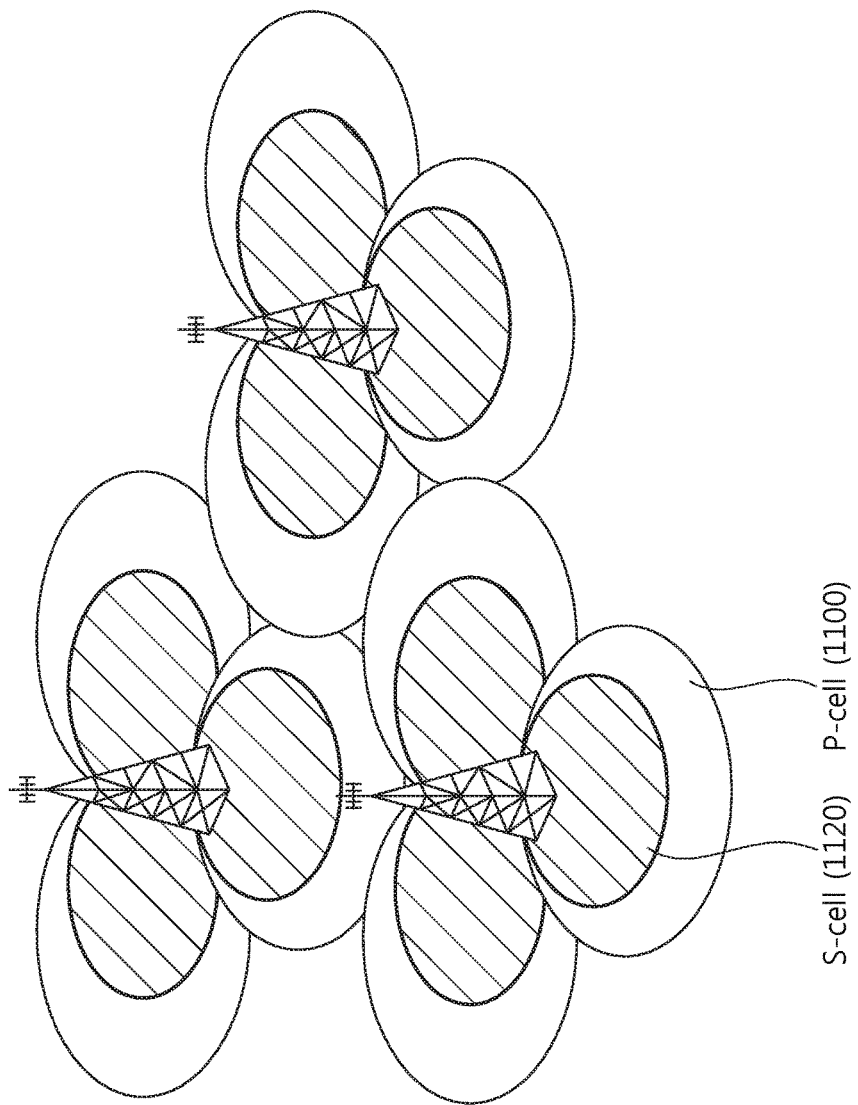
FIG. 11 is a concept view illustrating a P-cell and an S-cell.

FIG. 11 is a concept view illustrating a P-cell and an S-cell.

Referring to FIG. 11, the base station may conduct carrier aggregation based on PCCs of a P-cell 1100 and SCCs of one or more S-cells 1120. In case there are two or more cells, the base station may determine one of them as the P-cell 1100 and the rest as the S-cells 1120. The base station may aggregate the CCs of the determined P-cell 1100 and S-cells 1120, and the base station may transmit data to the terminal using the aggregated frequency bandwidth. The terminal may transmit data to the base station using the aggregated frequency bandwidth. FIG. 11 illustrates an exemplary scenario of deployment of a P-cell 1100 and S-cells 1120, where the coverage of data transmission based on the PCCs of the P-cell 1100 is larger than the coverage of data transmission based on the SCCs of the S-cell 1120.

The terminal may perform RRC (radio resource control) connection through the PCCs of the P-cell 1100. Further, the terminal may attempt random access to the base station through a PRACH (physical random access channel) based on a signal signaled through the PCCs. In other words, the terminal may conduct an initial connection establishment or connection re-establishment process to the base station through the PCCs in the carrier aggregation environment.

The SCCs of the S-cell 1120 may be used to provide additional radio resources. In order to perform carrier aggregation of adding SCCs to PCCs, the terminal should fulfil a neighbor cell measurement of obtaining information regarding neighbor cells. Based on the neighbor cell measurement performed by the terminal, the base station may determine whether to aggregate the SCCs to the PCCs. For example, the P-cell may transmit a legacy sub-frame through a PCC, and the S-cells may transmit, through SCCs, NCT sub-frames to be described below. The legacy sub-frame may have a sub-frame format as defined in 3GPP LTE-A release 11 or its precedents or the legacy sub-frame may be a sub-frame used to distinguish from the NCT sub-frame newly defined in 3GPP LTE-A release 12.

The base station may transmit PDCCH data to the terminal through a PCC. The PDCCH data may contain allocation information for the PDSCH data transmitted through a downlink PCC band and SCC band and information regarding grant of uplink data transmission.

The P-cell 1100 and the S-cell 1120 may perform carrier aggregation through a configuration and activation operation, and the cells 1100 and 1200 may communicate data through the aggregated frequency band.

Figure 12:
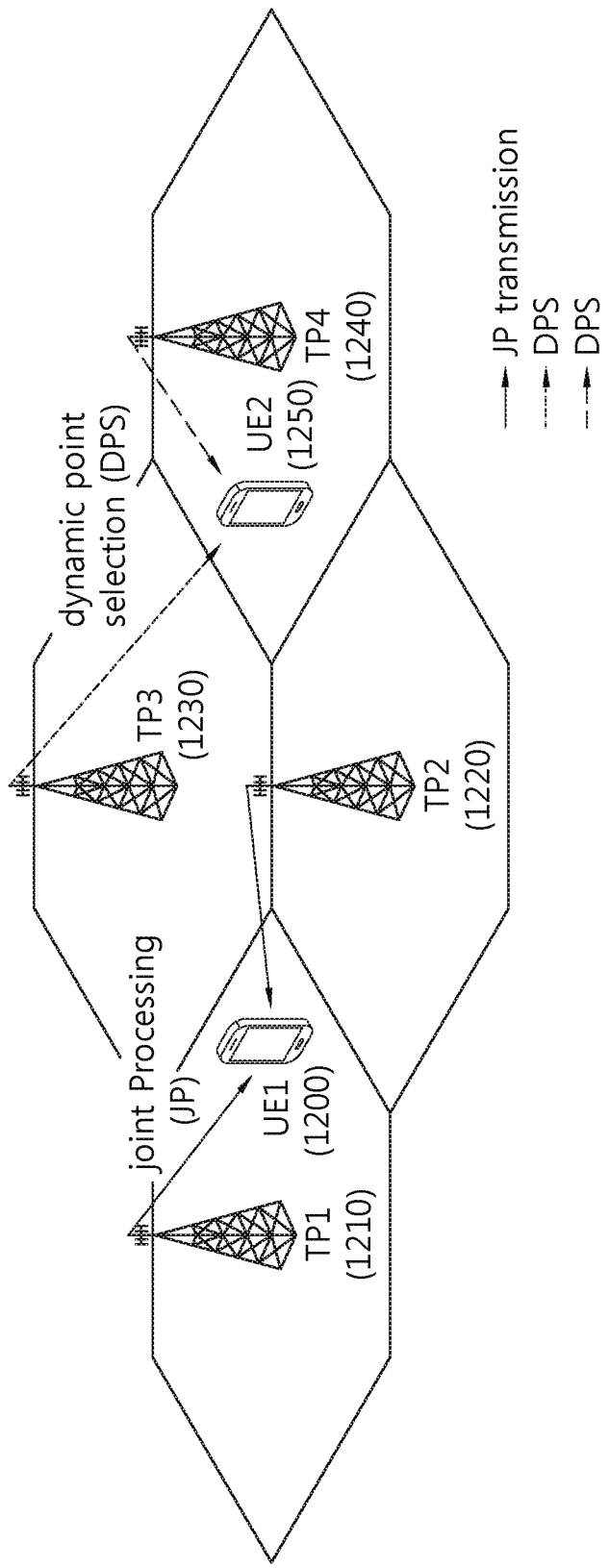
FIG. 12 is a concept view illustrating a method of transmitting data from a plurality of transmission points to a terminal based on CoMP (coordinated multi-point).

FIG. 12 is a concept view illustrating a method of transmitting data from a plurality of transmission points to a terminal based on CoMP (coordinated multi-point).

Referring to FIG. 12, traffic data and control data may be transmitted from multiple transmission points to the terminal based on CoMP. The multiple transmission points may generate data that is to be transmitted to the terminal in the cell, based on the same or different cell IDs. The multiple transmission points may also be denoted multiple serving cells or cells. CoMP enables data transmission and reception based on different serving cells.

In the illustrated method, transmission point 1 1210 and transmission point 2 1220 transmit data to the terminal using JT (joint transmission) among the CoMP techniques. In case the multiple transmission points 1210 and 1220 transmit data using the JT technique, the same data may be simultaneously transmitted from the different transmission points 1210 and 1220 to the terminal 1200. The terminal 1200 may receive the data from the different transmission points 1210 and 1220, and the terminal 1200 may demodulate the received data.

Transmission point 3 1230 and transmission point 4 1240 may transmit data to the terminal 1250 using DPS (dynamic point selection) among the CoMP techniques.

By DPS, the terminal may dynamically select one with a relatively better channel of the different transmission points 1230 and 1240, and the terminal may receive data. For example, in case the third transmission point 1230 transmits ePDCCH data to the terminal 1250 at a first time, the second transmission point 1240 may transmit ePDCCH data to the terminal 1250 at a second time.

Figure 13:
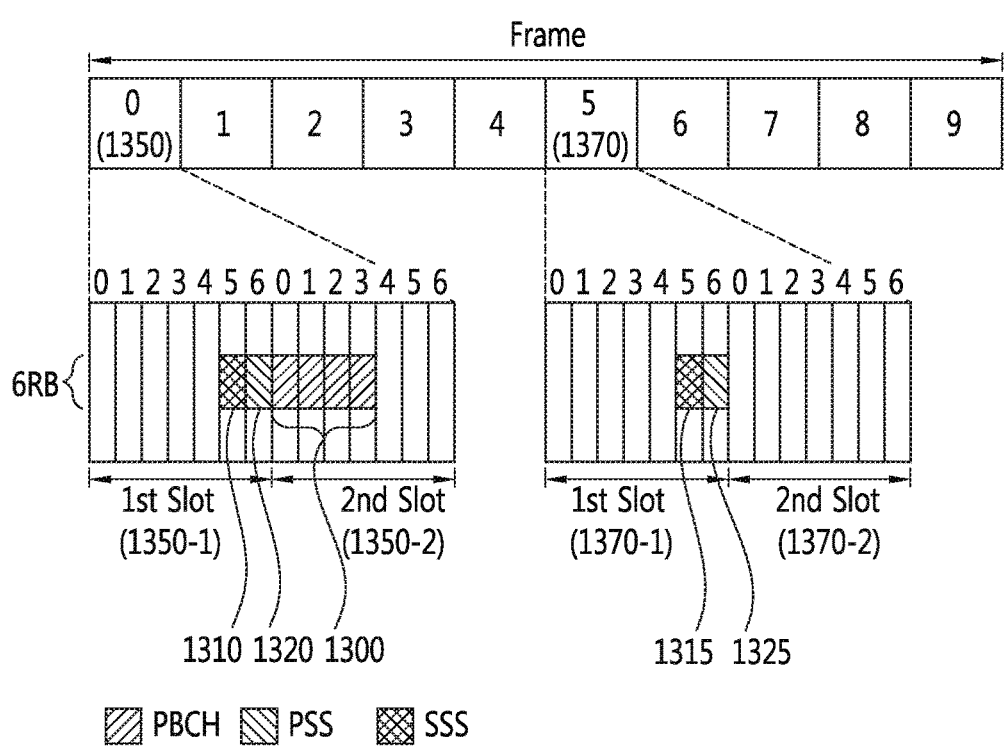
FIG. 13 illustrates an example of transmission of a synchronization signal and PBCH data in a legacy sub-frame when using FDD (frequency division duplex as a duplexing scheme.

FIG. 13 illustrates an example of transmission of a synchronization signal and PBCH data in a legacy sub-frame when using FDD (frequency division duplex as a duplexing scheme.

A PBCH (physical broadcast channel) 1300 is transmitted in first four OFDM symbols of the second slot 1350-2 in the first sub-frame (sub-frame indexed 0) 1350 of the radio frame. The PBCH 1300 carries system information necessary for the wireless device to communicate with the base station, and the system information carried through the PBCH 1300 is denoted an MIB (master information block). In comparison, the system information transmitted over a PDSCH, as indicated by a PDCCH, is denoted an SIB (system information block).

Among the OFDM symbols allocated to the first slots 1350-1 and 1370-1 of the first sub-frame (sub-frame index 0, 1350) and the sixth sub-frame (sub-frame index 5, 1370), the seventh OFDM symbols (OFDM symbols index 6) may contain PSSs (Primary Synchronization Signals, 1320 and 1325). The PSSs 1320 and 1325 may be used to achieve OFDM symbol sync or slot sync. Further, Information on physical cell IDs may be obtained through the PSSs 1320 and 1325. A PSC (primary synchronization code) is a sequence for generating the PSSs 1320 and 1325. In 3GPP systems, a plurality of PSCs may be defined to generate PSSs. The base station generates the PSSs 1320 and 1325 using one of three PSCs depending on cell IDs. The terminal may receive the PSSs 1320 and 1325, and the terminal may obtain information on a cell ID based on the PSC.

Among the OFDM symbols allocated to the first slots 1350-1 and 1370-1 of the first sub-frame (sub-frame index 0, 1350) and the sixth sub-frame (sub-frame index 5, 1370), the sixth OFDM symbols (OFDM symbols index 5) may contain SSSs (Secondary Synchronization Signals, 1310 and 1315).

The first SSS 1310 may be transmitted through the sixth OFDM symbol of the first slot 1350-1 in the first sub-frame 1350, and the second SSS 1325 may be transmitted through the sixth OFDM symbol of the first slot 1370-1 in the sixth sub-frame 1370. The SSSs 1310 and 1315 may be used to achieve frame sync. The SSSs 1310 and 1315, together with the PSSs 1320 and 1325, are used to obtain information on a cell ID.

The first SSS 1310 and the second SSS 1315 may be generated using different SSCs (Secondary Synchronization Codes). Assuming that the first SSS 1310 and the second SSS 1315 each include 31 sub-carriers, two SSC sequences each having a length of 31 are used for the first SSS 1310 and the second SSS 1315, respectively.

As viewed in the frequency domain, the PBCH 1300, the PSSs 1320 and 1325, and the SSSs 1310 and 1315 are transmitted in a frequency bandwidth corresponding to six RBs with respect to the center frequency of the sub-frame.

A new format of sub-frame may be defined and used in new LTE-A releases. The newly defined sub-frame may be defined as an NCT sub-frame (new carrier sub-frame). The NCT sub-frame may be specifically defined as follows.

In the existing LTE release 8/9/10 systems, control channels, such as CRSs, PSSs/SSSs, PDCCHs, and PBCHs, reference signals, and synchronization signals may be transmitted through downlink carriers. The sub-frames defining such control channels, reference signals, and synchronization signals may be referred to as legacy sub-frames. In post-LTE release 8/9/10 systems, some of the channels or signals that used to be sent in existing legacy sub-frames might not be subjected to transmission in order for reduced interference between a plurality of cells and better carrier extendibility. Such sub-frames may be defined as extension carrier sub-frames or NCT sub-frames. For example, the NCT sub-frames might not contain reference signal information and/or control channels such as PDCCH data and CRSs. For example, in case an NCT sub-frame contains no PDCCH, control information may be transmitted through an EPDCCH. A PDSCH of an NCT sub-frame may be allocated based on the EPDCCH included in the NCT sub-frame.

For example, assume that a legacy sub-frame and an NCT sub-frame both are transmitted from multiple transmission points (TPs) based on CoMP. In such case, the PDCCH included in the legacy sub-frame may also contain the information regarding allocation of a PDSCH that is transmitted through the NCT sub-frame. The NCT sub-frame may transmit downlink control information such as a DCI through the EPDCCH. Since no CRS is transmitted in the NCT sub-frame, the DCI may be demodulated based on a reference signal such as a DM-RS. One sub-frame that has undergone configuration of an NCT sub-frame and a legacy sub-frame in the TDM (time division multiplexing) scheme may also be referred to as an NCT sub-frame. For example, in case a sub-frame includes a slot generated through channel and signal configuration of an NCT sub-frame and another slot generated through channel and signal configuration of a legacy sub-frame, the sub-frame may be denoted an NCT sub-frame. Further, an NCT sub-frame and a legacy sub-frame may be transmitted in one frame that is temporally divided in the TDM scheme. For example, a frame transmitted in one cell may contain both an NCT sub-frame and a legacy sub-frame, and such frame may be called an NCT frame as well.

Assuming a P-cell transmitting data based on a legacy sub-frame and an S-cell transmitting data using an NCT sub-frame, data may be transmitted to the terminal based on the P-cell and the S-cell. In other words, the NCT sub-frame may be a sub-frame transmitted in an SCC that is a frequency band allocated to an S-cell. When transmitting data to the terminal based on the P-cell and the S-cell, the base station may inform the S-cell of the position of the OFDM symbol where the PDSCH starts in the legacy sub-frame through higher layer signaling. The parameter indicating the position of the OFDM symbol where the PDSCH starts in the legacy sub-frame is denoted $I_{datastart}$ parameter. The $I_{datastart}$ parameter may have a value in a range from 1 to 4.

The NCT frame may include ten NCT sub-frames. The NCT frame may transmit a reference signal for performing time/frequency tracking through specific sub-frames only, not all the sub-frames therein. The reference signal for performing time/frequency tracking, included and transmitted in the NCT sub-frame, may be referred to as a TRS (tracking reference signal). Instead of the term "TRS," the term "eSS (enhanced synchronization signal)" or "reduced CRS" may be used to denote the reference signal for performing time/frequency tracking, which is transmitted over the NCT sub-frame. The TRS may be transmitted in specific sub-frames (e.g., sub-frame 0 and sub-frame 5) of one NCT frame. The TRS may be a reference signal defined to be transmitted in a specific RE of a specific RB in an NCT sub-frame.

The TRS-configured RE in the NCT sub-frame may be transmitted without mapped with PDSCH data. That is, in the NCT sub-frame, data rate matching for PDSCH data may be conducted considering the TRS-configured RE. Another NCT sub-frame may be a sub-frame of a type in which a TRS-configured RE has been punctured.

An antenna port for transmitting a TRS may be defined as antenna port x. In case the base station transmits the TRS based on antenna port x, the base station might not map PDSCH or ePDCCH data to the RE corresponding to antenna port x.

An initial value of a pseudo-random sequence used for generating a TRS may be determined based on $c_{init}=2^{10} \cdot (7 \cdot (n_s+1)+l+1) \cdot (2 \cdot N_{ID}^{cell}+1)+2 \cdot N_{ID}^{cell}+N_{CP}$. Here, $n_s$ may be a slot number, l may be an OFDM symbol number, $N_{ID}^{cell}$ is a cell identifier, and $N_{CP}$ is a CP length. $N_{CP}$ may have different values depending on CP types.

v-shift may be used as a parameter to reduce inter-cell interference. v-shift may be used as a parameter to adjust the position of the RE mapped with a TRS. For example, v-shift may be determined based on $v_{shift}=N_{ID}^{cell} \mod 6$. v-shift may be a fixed value, e.g., 0.

Figure 14:
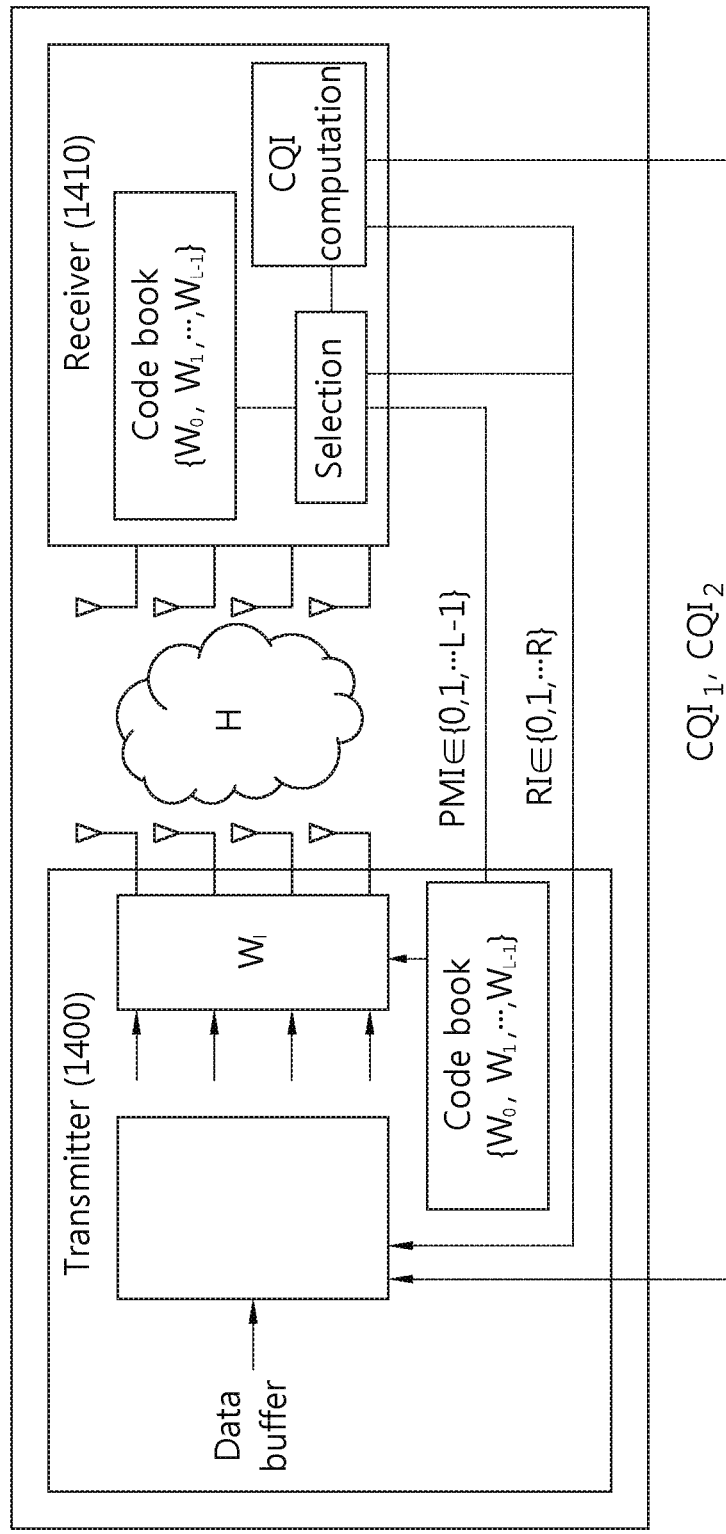
FIG. 14 is a concept view illustrating transmission of a CSI-RS and a CSI feedback measured by a terminal.

FIG. 14 is a concept view illustrating transmission of a CSI-RS and a CSI feedback measured by a terminal.

Referring to FIG. 14, the terminal 1410 may feed back to the base station 1400 channel information produced based on a CSI-RS transmitted from the base station 1400 using parameters such as an RI (rank index), a PMI (precoding matrix index), or a CQI (channel quality indicator). The parameters indicating channel information, such as an RI, a PMI, or a CQI, may be denoted CSI (channel state information) feedback information. Each type of CSI feedback information may play a role as follows:

(1) RI (rank index) may contain information on a transmission rank. In other words, information on the number of layers used for downlink transmission may be provided to the base station based on the RI.

(2) PMI (precoding matrix index) may contain information on a precoding matrix used for downlink transmission.

(3) CQI (channel-quality indication) may contain information on an MCS (modulation and coding scheme).

The terminal 1410 may report information on the downlink channel state by transmitting the RI, PMI, CQI or other information indicating the channel state, as the feedback information for the CSI-RS transmitted from the base station 1400.

The CRS is also a reference signal that may be used for the terminal to obtain downlink channel state information. Accordingly, the CRS may overlap, in role, the CSI-RS. The CSI-RS may be used to supplement the CRS, an existing reference signal. As the number of transmit antennas increases, the CSI-RS may be used to determine better the channel state information than the existing reference signal, CRS. The existing CRS density was set high in order to enable channel measurement in the very quickly varying channel environment. Accordingly, the CRS operates as a high overhead. In contrast, the CSI-RS is a reference signal used only to obtain CSI, and thus, the CSI-RS has low time-frequency density. Accordingly, the CSI-RS has a lower overhead than the CRS. Therefore, as a new type of reference signal, rather than extensions to the existing reference signal, CRS, the CSI-RS having low time-frequency density and low overhead may be defined and used.

One cell or base station may include one, two, four, or eight CSI-RSs for each resource block pair, and may transmit the same to the terminal. A CSI-RS configuration is a deployment of CSI-RSs in a resource grind, and there may be different CSI-RS configurations depending on the number of CSI-RSs used in one cell.

Figure 15:
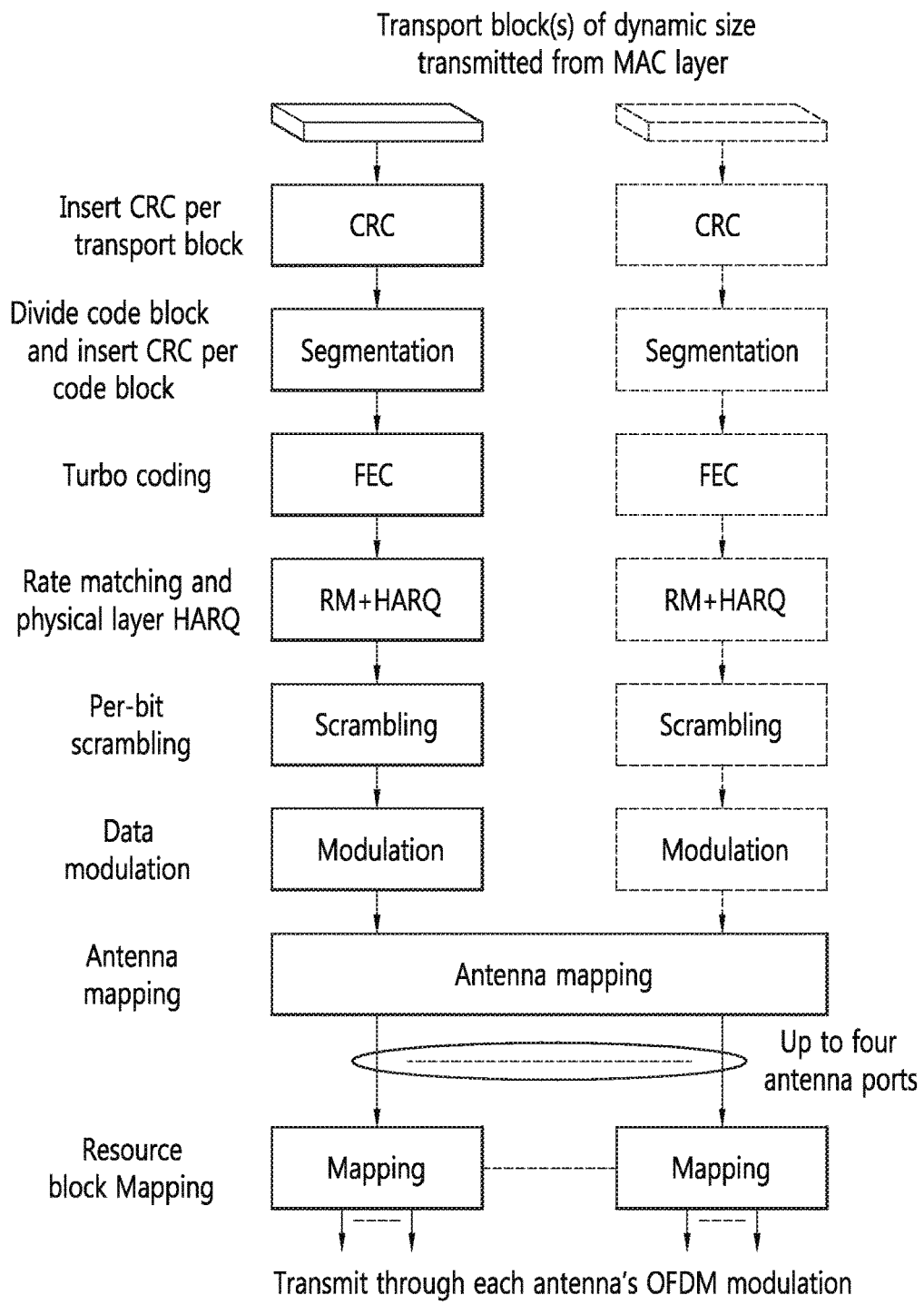
FIG. 15 is a concept view illustrating a downlink transport channel processing method.

FIG. 15 is a concept view illustrating a downlink transport channel processing method.

FIG. 15 illustrates an operation in which a transport block is transmitted via a transport channel to a physical layer.

An LTE physical layer interfaces with its higher layer, an MAC layer, by way of a transport channel. In the case of single antenna transmission, there is a dynamically-sized transport block per TTI (transmission time interval). For example, in the case of multi-antenna transmission, there may be multiple (e.g., two) dynamically-sized transport blocks per TTI.

FIG. 15 illustrates a processing procedure for DL-SCH transmission in conducting an LTE downlink transmission process. The second processing procedure corresponding to the second transport block is provided only in the case of downlink spatial multiplexing. In the case of spatial multiplexing, two different-size transport blocks may be typically combined with each other through antenna mapping. The LTE downlink transport channel processing method illustrated in FIG. 15 is now described.

(1) Insertion of CRC Per Transport Block

At the first step of the transport channel processing, a 24-bit CRC may be computed and the same may be added to each transport block. Errors in the decoded transport blocks may be detected at the reception end through the CRC. For example, a downlink HARQ protocol may be used to inform the detected errors and to request re-transmission.

(2) Segmentation of Code Block and Insertion of CRC Per Code Block

The interleaver in the LTE turbo code may be restricted as per size, and the same may be defined only for a limited size of code blocks having a specific bit in the maximum block size. In case the size of the CRC-added transport block is more than the maximum code block size, code block segmentation may be conducted before turbo coding is conducted. The code block segmentation refers to dividing the transport block into smaller code blocks that fit the code block size defined in the turbo code.

(3) Turbo Coding

In LTE systems, the WCDMA/HSPA turbo encoder internal interleaver has been replaced with QPP (quadrature permutation polynomial)-based interleaving. Contrary to the WCDMA/HSPA turbo code interleaver, the QPP-based interleaver is a maximally contention-free interleaver, and thus, the QPP-based interleaver may enable simple parallelization of a decoding process without collision even when different parallel processes approach the interleaver memory.

(4) Rate Matching and Physical Layer HARQ Function.

Rate matching and physical layer HARQ are for correct selection of bits to be transmitted within a given TTI from the blocks of the code bits transferred from the channel encoder. The outputs from the turbo encoder (systematic bits, first parity bits, and second parity bits) each may be first subjected to interleaving. The interleaved bits may enter the circular buffer. The bit selection block extracts as many consecutive bits as the allocated resources from the circular buffer.

(5) Per-Bit Scrambling

LTE downlink scrambling refers to multiplying the blocks of code bits that have undergone the rate matching and HARQ by a per-bit scrambling sequence. In LTE systems, downlink scrambling may apply to code bits of each transport channel.

(6) Data Modulation

Downlink data modulation denotes a process of transforming scrambled bits into corresponding complex modulated symbols. The LTE downlink supports the following modulation schemes: QPSK, 16QAM, and 64 QAM. According to an embodiment of the disclosure, an example in which 256 QAM is also supported as an additional modulation scheme is described. In the modulation schemes, QPSK, 16QAM, and 64QAM respectively may correspond to two bits per symbol, four bits per symbol, and six bits per symbol. Different modulation schemes may be put in use depending on transport channels.

(7) Antenna Mapping

Typically, antenna mapping simultaneously processes modulation symbols corresponding to two transport blocks and maps the processed results to different antenna ports.

(8) Resource Block Mapping

Resource block mapping maps symbols to be transmitted through respective antenna ports to resource elements of resource blocks allocated to transport blocks transmitted to the terminal by an MAC scheduler.

Some resource elements in the resource blocks may be pre-occupied by other antenna port or control region, and such resource elements cannot be put in use.

The base station may use a downlink control channel (e.g., a PDCCH or ePDCCH) in order to transfer a data block size to the terminal. The information on the data block size transmitted through the PDSCH may be transmitted based on the resource allocation information and MCS, information related to modulation and coding rate. The MCS field may carry MCS information to the terminal based on, e.g., five bits. Resource allocation may be conducted from 1 RB to 110 RBs. In case the five bits of the MCS field all are in use in order to transmit MCS information without use of MIMO, 32 types of MCS information may be transmitted based on the five bits. In such case, a data block size corresponding to 32×110 may be signaled. However, among the 32 types of MCS information, three types of MCS information are used to indicate a change of modulation scheme when re-transmission is conducted, and signaling may be actually done for a data block size corresponding to 29×110. A data block may mean a transport block.

LTE systems may support modulation schemes such as QPSK, 16QAM, and 64QAM. At the switching point where a change of modulation scheme occurs, the same data block size may be indicated if the same resource allocation was received. This is for efficiently performing an operation in various channel environments. In order to indicate an actual data block size, IMCS, which is the MCS-related information transmitted through a downlink control channel, may be mapped to ITBS, which is other variable to indicate the data block size. The following Table 9 shows the relation between IMCS and ITBS.

TABLE 9

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |

TABLE 9-continued

| MCS Index $I_{MCS}$ | Modulation Order $Q_m$ | TBS Index $I_{TBS}$ |
|---|---|---|
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |

TABLE 9-continued

| MCS Index $I_{MCS}$ | Modulation Order $Q_m$ | TBS Index $I_{TBS}$ |
|---|---|---|
| 30 | 4 | |
| 31 | 6 | |

The transport block size transmitted on downlink may be determined by a combination of the resource allocation and the MCS field transmitted through a downlink control channel. The following Tables 10 and 11 show the transport block sizes under the relation between IMCS to ITBS as shown in Table 8 above for resource allocation from 1RB to 10RBs and for resource allocation from 101RBs to 110RBs.

TABLE 10

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

TABLE 11

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |

TABLE 11-continued

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |

For post LTE-A systems, it is considered to configure low-cost/low-spec terminals that are primarily targeted for data communications such as meter reading, water level measurement, utilization of surveillance camera, and stock reporting of vending machines. Hereinafter, according to an embodiment of the disclosure, such terminals may be termed MTC (Machine Type Communication) terminals for ease of description. The MTC terminals show low transmission data traffic, and data communication of such terminals on uplink and downlink is infrequent. Accordingly, the MTC terminals are required to come up with reduced costs and battery consumption to comply with low data transmission rates. In conducting channel prediction, the conventional channel measurement and channel measurement reporting methods might not be effective to MTC terminals with intermittent data traffic.

Further, such sporadic data communication characteristic of MTC terminals puts the terminals in such controllable situation where once data transmission or reception is conducted, the terminals may switch to sleep mode and go on their operation. Accordingly, performing one high-reliability transmission process rather than multiple transmission/reception processes based on ACK/NACK processes may be more effective to MTC terminals. MTC terminals tend to be installed in coverage-limiting areas, such as inside basements, rooms, or buildings. Accordingly, for high-reliability transmission, MTC terminals are in need of increased downlink/uplink transmission coverage.

Now described is a method for performing reliable transmission without the need of an HARQ process while increasing uplink/downlink transmission coverage of an MTC terminal, according to an embodiment of the disclosure. For ease of description, the term "terminal" as used hereinafter may include both typical legacy terminal and MTC terminal.

Figure 16:
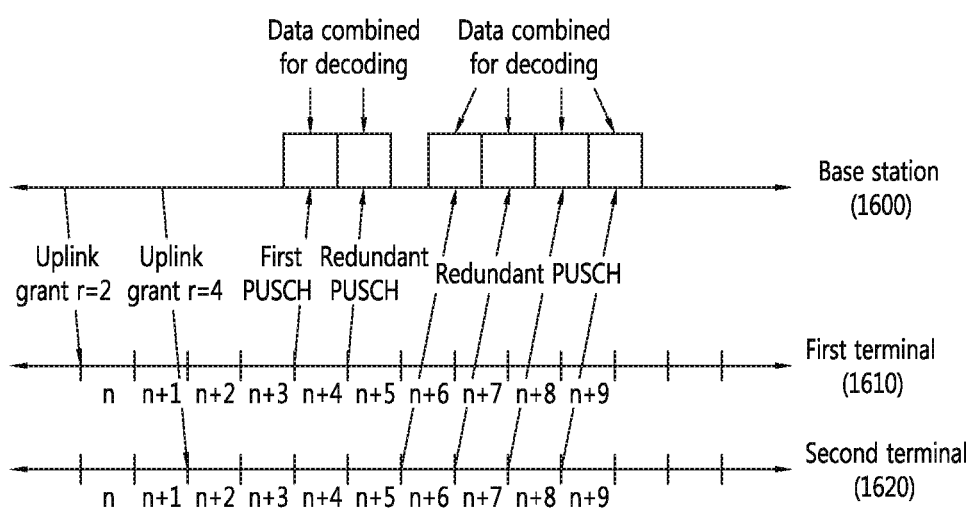
FIG. 16 is a concept view illustrating a dynamic uplink channel (control channel and data channel) repetition method according to an embodiment of the disclosure.

FIG. 16 is a concept view illustrating a dynamic uplink channel (control channel and data channel) repetition method according to an embodiment of the disclosure.

FIG. 16 illustrates a method of a terminal performing dynamic repetitive transmission of uplink data while conducting no HARQ process with a base station.

The terminal's repetitive uplink transmission may be useful for delay-sensitive applications such as VoIP (Voice over Internet Protocol). Various traffic patterns may be provided depending on terminals. For example, a certain terminal may have an intermittent traffic pattern. Further, some specific terminals may have different sensitivities to delay that occurs upon data communication. In data communication between the base station and the terminal, an HARQ process-based re-transmission method and a repetitive transmission-based re-transmission method may come in use. The HARQ process-based re-transmission method, as compared with the repetitive transmission-based re-transmission method, is effective in light of time diversity or frequency diversity. Accordingly, in case the data communicated between the terminal and the base station is insensitive to delay, the HARQ process-based re-transmission method may be more effective than the repetitive transmission-based re-transmission method.

In case the terminal is sensitive to delay, use of the HARQ process-based re-transmission method may create a latency to successfully complete the transmission. Accordingly, the HARQ process may be ineffective to delay sensitive terminals. Further, when the repetitive transmission method is put in use, the terminal may immediately switch to sleep mode without waiting for an additional response after transmitting data, thus reducing energy consumption. In light of such data communication characteristics and energy consumption, the repetitive transmission-based re-transmission method may be more appropriate for some terminals performing data re-transmission than the HARQ process.

Now described is a method for adaptively changing repetitive transmission counts depending on channel states when a terminal conducts repetitive transmission. For instance, the base station may dynamically signal a repetition count necessary for the MTC terminal to transmit data through an uplink grant. The terminal may repetitively transmit the same data to the base station based on the received repetition count. Such method is illustrated in FIG. 16.

Referring to FIG. 16, the first terminal 1610 and the second terminal 1620 may repetitively transmit the same data based on the repetition count received through an uplink grant from the base station 1600. Different redundant versions where the same data is transmitted may apply to enhance decoding performance.

Assuming FDD is in use for a duplexing scheme, when receiving an uplink grant at an nth sub-frame, the terminals may transmit redundant PUSCHs at an n+4th sub-frame to an n+4+(r−1)th sub-frame. r may be a redundant value indicating a repetitive transmission count.

For example, in case r is 2 such as for the first terminal 1610, the first terminal 1610 receives an uplink grant at an nth sub-frame in FDD, and the first terminal 1610 may transmit two redundant PUSCHs at an n+4th sub-frame and an n+5th sub-frame. The repetitive transmission of the base station may occur depending on the redundant value. In case r is 4 such as for the second terminal 1620, the second terminal 1620 receives an uplink grant at an n+2th sub-frame in FDD, and the second terminal 1620 may transmit four redundant PUSCHs at an n+6th sub-frame through an n+9th sub-frame.

Assuming TDD is in use for a duplexing scheme, when receiving an uplink grant at an nth sub-frame, the terminals may transmit redundant PUSCHs at an n+kth sub-frame to an n+k+(r−1)th sub-frame. Here, r is a redundant value, and k is a variable that may be determined according to frame configurations (UL/DL sub-frame configurations) in TDD in order for the terminal to perform uplink transmission.

The redundant value 'r' may be included in an uplink grant DCI transmitted from the base station and may be transmitted to the terminal. Assuming that DCI format 0 is used for uplink grant, a new field may be added or an existing field may be used in order to transmit the redundant value 'r,' which is included in the DCI format, to the terminal. Now described is a method of transmitting 'r,' which is used for uplink grant, from the base station.

(1) Method of transmitting a redundant value using a carrier indicator.

Some specific terminals, such as MTC terminals, might not support carrier aggregation. Accordingly, a CIF may be used to indicator the redundant value, 'r.' A CIF is a field used to allow for application of cross scheduling by which the PDCCH of one CC (component carrier) may transmit data information of other CC. For example, assuming that the CIF included in an uplink grant is used to indicate a redundant value, the terminal may obtain the redundant value based on the uplink grant information.

(2) Method of transmitting a redundant value using a portion of an MCS field.

In the method of using a portion of an MCS field, the MCS index used by the terminal is constrained, so that the remaining bits of the MCS field may be used to transmit a redundant value.

For example, a specific MTC terminal may support, as its modulation method, only BPSK, but not re-transmission. Such terminal may use only MCS indexes corresponding to BPSK, and thus, the MCS indexes may be assumed to be always 0. In such case, the five bits for MCS index may be all used for the redundant value. Further, for example, a specific MTC terminal may support, as its modulation method, only QPSK. In this case, MCS indexes 0 to 9 whose modulation order is 2 may be used. In such case, the number of MCS indexes usable by the terminal may be limited to eight, so that three bits only may be put in use. As such, only three bits among the five bits for MCS index are put in use, thus ending up leaving two bits. The two remaining bits may be used for redundant values. The redundant values indicated with the two bits may be shown as in the following Table 12.

TABLE 12

| Field in Format 0 | Redundancy value r |
| --- | --- |
| 0 | 1 |
| 1 | 2 |
| 2 | 4 |
| 3 | 8 |

In case the number of MCS indexes are limited to eight, among ten candidates, eight may be selected, and the terminal may use IMCS=0 through IMCS=7 as MCS indexes.

In order to use such method, a set of MCS indexes (the size of the set is eight or sixteen) may be selected by the base station to reduce the number of MCS fields with DCI format 0. The base station may RRC signal the selected MCS index use information to the MTC terminal.

For example, the base station may determine the MCS indexes {0, 1, 2, 3, 10, 11, 29, 30} among the MCS indexes as eight MCS indexes that may be used by the terminal. The base station may map information on the determined MCS index and the MCS field of DCI format and the base station may transmit the same to the terminal through RRC signaling.

(3) Method of transmitting a redundant value using a combination of NDI (new data indicator), TPC (transmit power control), and CSI (channel state information) request fields.

NDI field (one bit): uses only repetitive transmission as its re-transmission method, but not the HARQ process. Therefore, the NDI may be used to represent a redundant value.

TPC field (two bits): assuming that the terminal is intermittently in a wakeup state and that transmission is initiated by random access, power is set by a random access process. Accordingly, there may be no need to immediately perform power control on the PUSCH transmitted from the terminal. Therefore, a redundant value may be transmitted based on the TPC field used for conducting power control of the PUSCH for the terminal.

CSI request field (one bit): assuming that the terminal enters into sleep mode after transmission of the PUSCH, the base station might not need to separately transmit the CSI request field to the terminal through the DCI format. Accordingly, the bit used as the CSI request field may be used to transmit a redundant value.

The overall four bits indicating the NDI field, the TPC field, and the CSI request field may be used as redundant values, or three bits, a combination of the NDI field and the TPC field or a combination of the TPC field and the CSI request field, may be used as redundant values, or the CSI request field (one bit) may be used as a redundant value. That is, various combinations of the NDI field, the TPC field, and the CSI request field may be used to indicate redundant values.

For example, in case one bit is used as redundant values, the bit may be mapped to redundant values as shown in Table 13.

TABLE 13

| Field in Format 0 | Redundancy value r |
| --- | --- |
| 0 | 2 |
| 1 | 4 |

As another example, in case two bits are used as redundant values, the two bits and the redundant values may be mapped to each other as shown in Table 12.

Various methods for configuring uplink resources used for repetitive transmission may come in use. For example, similar to TTI bundling, an uplink resource for repetitive transmission may be granted through one DCI transmitted from the base station to the terminal. In other words, the uplink resource used for repetitive transmission may be granted through one DCI. The uplink resource used for repetitive transmission may be subjected to frequency hopping. Frequency hopping between uplink resources may be conducted in one sub-frame or between sub-frames.

According to an embodiment of the disclosure, a redundant value related to the ACK/NACK repetition count transmitted from the terminal may be adaptively determined. The ACK/NACK repetition count transmitted from the terminal may be dynamically determined through PDCCH DCI for scheduling a PDSCH. Various methods may be used to transmit the redundant value related to the ACK/NACK repetition count. For example, as described above, a specific bit(s) of the MCS field, and in case the HARQ process is not in use, the field used in the HARQ process may be used, or a new field may be added. Further, since the TPC field might not be used for PUCCH, the TPC field may also be used to represent the ACK/NACK repetition count.

A method of determining a repetitive transmission count used for uplink transmission may apply to downlink data channels (e.g., PDSCH). Further, the technique of determining the repetitive transmission count may apply to downlink control channels such as PDCCH or EPDCCH. In such case, the redundant value 'r' for repeating a downlink control channel such as PDCCH or EPDCCH may be fixed (e.g., r=4), or the redundant value may be set by the terminal through an RRC message, or the redundant value may be broadcast to the terminal through an SIB.

Now described is a method of conducting repetitive transmission in order not to increase a count of blind decoding carried out by the terminal in case (E)PDCCHs are repetitively transmitted in multiple downlink sub-frames. Among the repetitively transmitted (E)PDCCHs, the first (E)PDCCH is defined as first (E)PDCCH, and the remaining (E)PDCCHs are defined as repetitive (E)PDCCHs.

Figure 17:
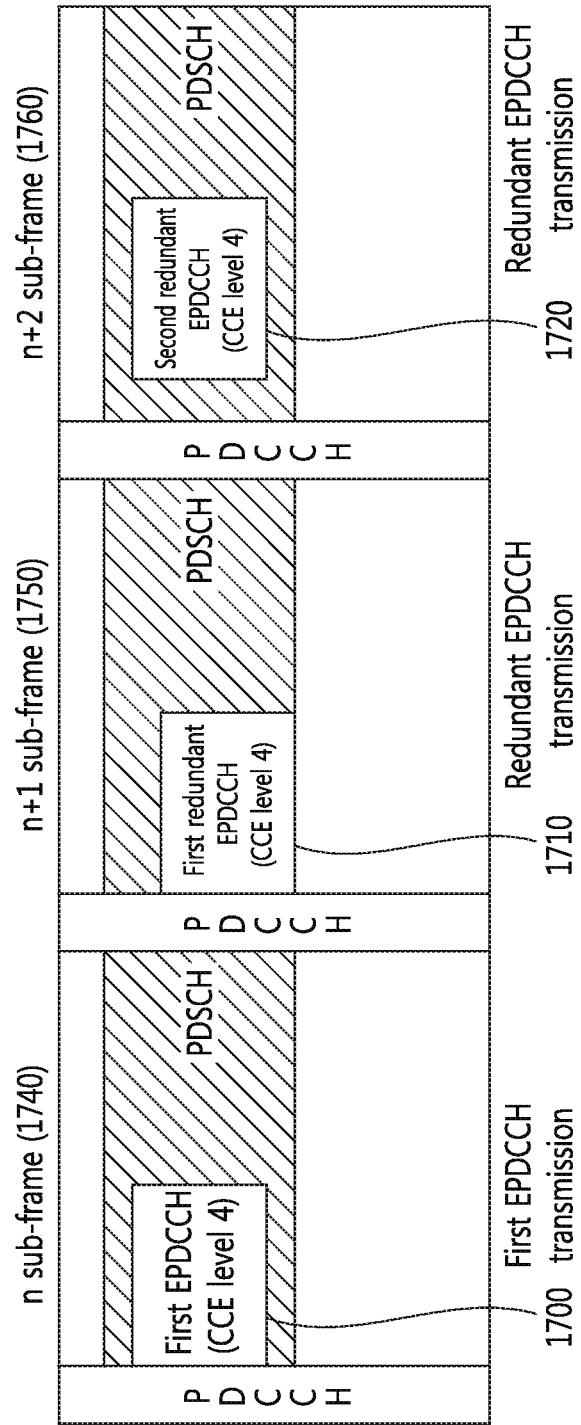
FIG. 17 is a concept view illustrating a configuration of a control channel upon downlink channel (control channel and data channel) repetitive transmission according to an embodiment of the disclosure.

FIG. 17 is a concept view illustrating a configuration of a control channel upon downlink channel (control channel and data channel) repetitive transmission according to an embodiment of the disclosure.

FIG. 17 illustrates a method of configuring the aggregation level of the repetitive (E)PDCCHs to be the same as the CCE aggregation level of the first (E)PDCCH.

In case the repetitive EPDCCHs are transmitted in other sub-frames than the sub-frame where the first EPDCCH is transmitted, the redundant (or repetitive) EPDCCHs may be allocated to the same EPDCCH candidate set as the EPDCCH candidate set where the first EPDCCH is transmitted. If the terminal receives two EPDCCH candidate sets so that the redundant EPDCCHs and the first EPDCCH in one sub-frame at the same time, the EPDCCH candidate set of the redundant EPDCCHs and the EPDCCH candidate set of the first EPDCCH may differ from each other. In such case, the first EPDCCH and the redundant EPDCCHs may be transmitted in one sub-frame. Upon designation of EPDCCH candidate sets, the terminal may be designated for whether the designated EPDCCH candidate set is for the redundant EPDCCHs or for the first EPDCCH. Further, the terminal may determine that the EPDCCH candidate set indicated with the redundant EPDCCHs may be identical to the EPDCCH candidate set indicated with the first EPDCCH in allocation type information (distributed type or localized type). As another example, in case the allocation type information differs between the EPDCCH candidate sets, although the terminal has been designated to be able to use the redundant EPDCCHs, the terminal may determine that the redundant EPDCCHs are not transmitted in the EPDCCH candidate set.

By configuring the CCE aggregation level of the redundant EPDCCHs to be the same as the CCE aggregation level of the first EPDCCH, although the redundant EPDCCHs are transmitted over several sub-frames, the EPDCCH candidate set to be monitored by the terminal might not be increased. For example, it may be assumed that the redundant value is 3 and that the first EPDCCH and the redundant EPDCCHs are transmitted in an nth sub-frame 1740 to an n+2th sub-frame 1760. It may be assumed that the terminal has received an EPDCCH 1740 whose CCE aggregation level is, e.g., 4, in the nth sub-frame 1740. In such case, the terminal may determine that the EPDCCHs 1710 and 1720 having the same CCE aggregation level 4 are transmitted in the n+1th sub-frame 1750 and the n+2th sub-frame 1760 for performing redundant transmission on the EPDCCH. Use of such method enables the terminal to conduct blind decoding on the redundant EPDCCHs without unnecessarily performing aggregation on other CCE aggregation levels. Further, by configuring the CCE candidate m value of the redundant EPDCCHs to be the same as the CCE candidate m value of the first EPDCCH, the terminal may keep the blind decoding count for the redundant EPDCCHs identical to the existing value regardless of redundant control channels without unnecessarily conducting aggregation on other m values.

Further, each terminal, in the case of being previously allocated or not allocated with an aggregation level and/or CCE candidate m value to be used for the redundant control channel, may aggregate up to 44 candidates as shown in Table 2 and may perform decoding. When allocated, the number of candidates may be reduced. The terminal, in the case of not being separately designated for an aggregation level and/or CCE candidate m value, may determine an aggregation level based on the allocated RNTI. For example, the terminal may determine an aggregation level based on a predetermined equation (e.g., RNTI % 4). For example, in case RNTI % 4 is 0, 1, 2, and 3, the terminal may determine the aggregation level as 1, 2, 4, and 8, respectively. Or the terminal may associate the CCE candidate m value with the RNTI in a similar way or also associate the start CCE index or resource position with the RNTI to thereby determine an aggregation level and/or CCE candidate m value without separate designation.

The proposed disclosure may be applicable to the UE-specific search space and common search space in similar ways. Further, the CCE candidate m values, aggregation levels, CCE indexes, or separate resources may be designated to be different between the UE-specific search space and the common search space. Further, in case multiple EPDCCH candidate sets have been configured, it may be assumed that redundant EPDCCHs come in the same EPDCCH candidate set.

Figure 18:
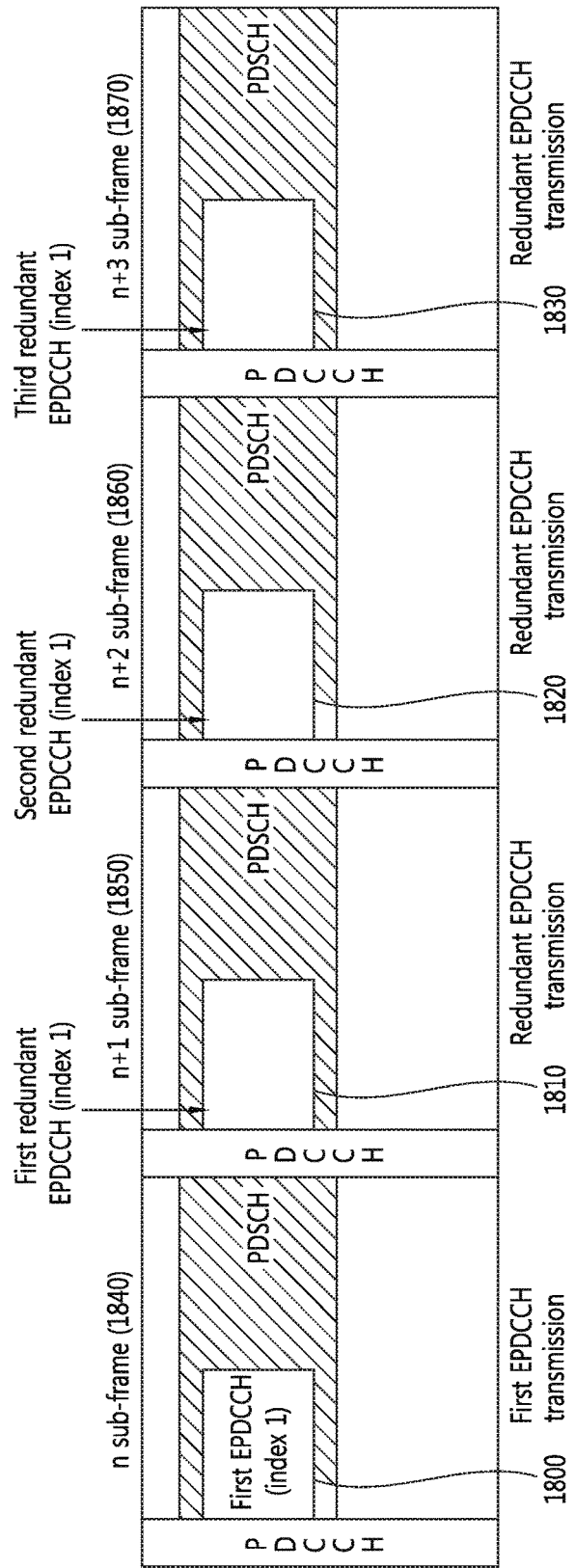
FIG. 18 is a concept view illustrating a configuration of a control channel upon downlink repetition transmission according to an embodiment of the disclosure.

FIG. 18 is a concept view illustrating a configuration of a control channel upon downlink repetition transmission according to an embodiment of the disclosure.

As shown in FIG. 18, resource allocation for the DCI transmitted in the redundant (E)PDCCHs and the DCI transmitted in the first (E)PDCCH may be previously determined.

The terminal may decode the DC's by performing blind decoding on a plurality of DCI candidates (or (E)PDCCH candidates). According to an embodiment of the disclosure, resource allocation for the DCI transmitted in the redundant (E)PDCCHs and the DCI transmitted in the first (E)PDCCH may be previously determined. The resources allocated to the first EPDCCH and the redundant EPDCCHs may be transmitted in the system information block (SIB) and may be designated by the terminal. Or, specific resources of a few resources may be designated as resources to transmit the first EPDCCH and the redundant EPDCCHs based on the RNTI designated to the terminal. Or, the resources allocated to the first EPDCCH and the redundant EPDCCHs may be varied depending on the index of the sub-frame, and a varying pattern may be previously designated.

In other words, the terminal may obtain the information (e.g., resource designation information and CCE index) on the resources transmitting the EPDCCH and redundant EPDCCHs based on the designated or preset information. Further, the resources allocated to the first EPDCCH and the redundant EPDCCHs may be readjusted based on a higher layer signal. Until before receiving a signal indicating that resource allocation has been readjusted, the terminal may decode the first (E)PDCCH and redundant (E)PDCCHs based on the CCE index or resource allocation determined by, e.g., its RNTI and/or sub-frame index. In case the resource allocation is readjusted, the first (E)PDCCH and the redundant (E)PDCCHs may be decoded based on the readjusted resource allocation.

The terminal may index DCI candidates performing blind decoding according to the resource allocation on the downlink control channel. The DCI candidate indexes may be values from 0 to M to indicate the DCI candidates, and the same DCI candidate index may be a DCI allocated to the same resource position. In such case, the DCI candidate index transmitted in the first (E)PDCCH and the DCI candidate index transmitted in the redundant (E)PDCCHs may have the same index value.

Referring to FIG. 18, for example, DCI may be repetitively transmitted on the downlink control channel of four sub-frames (nth sub-frame 1840, n+1th sub-frame 1850, n+2th sub-frame 1860, and n+3th sub-frame 1870) starting from the nth sub-frame 1840. According to an embodiment of the disclosure, in case the terminal conducts blind decoding on (E)PDCCHs, the DCI transmitted in the first (E)PDCCH 1800 and the DCI transmitted in the redundant (E)PDCCHs 1810, 1820, and 1830 may have the same resource allocation. For example, in case the DCI transmitted in the first (E)PDCCH 1800 is transmitted at the position of the first DCI candidate index (index 1), the DCI transmitted in the redundant (E)PDCCHs 1810, 1820, and 1830 may also be transmitted at the position of the same first DCI candidate index (index 1). Use of such method may reduce the number of times of blind decoding the redundant (E)PDCCHs 1810, 1820, and 1830. In another method, predetermined DCI candidate indexes, although they are not the same DCI candidate index, may be used for the first (E)PDCCH 1800 and the redundant (E)PDCCHs 1810, 1820, and 1830. Use of such method may prevent a drastic increase in the number of times of blind decoding performed by the terminal.

Further, a set of DCI candidate indexes used for repetitive transmission of (E)PDCCHs may be predetermined, fixed, signaled from a higher layer to the terminal, or broadcast to the terminal through an SIB.

Figure 19:
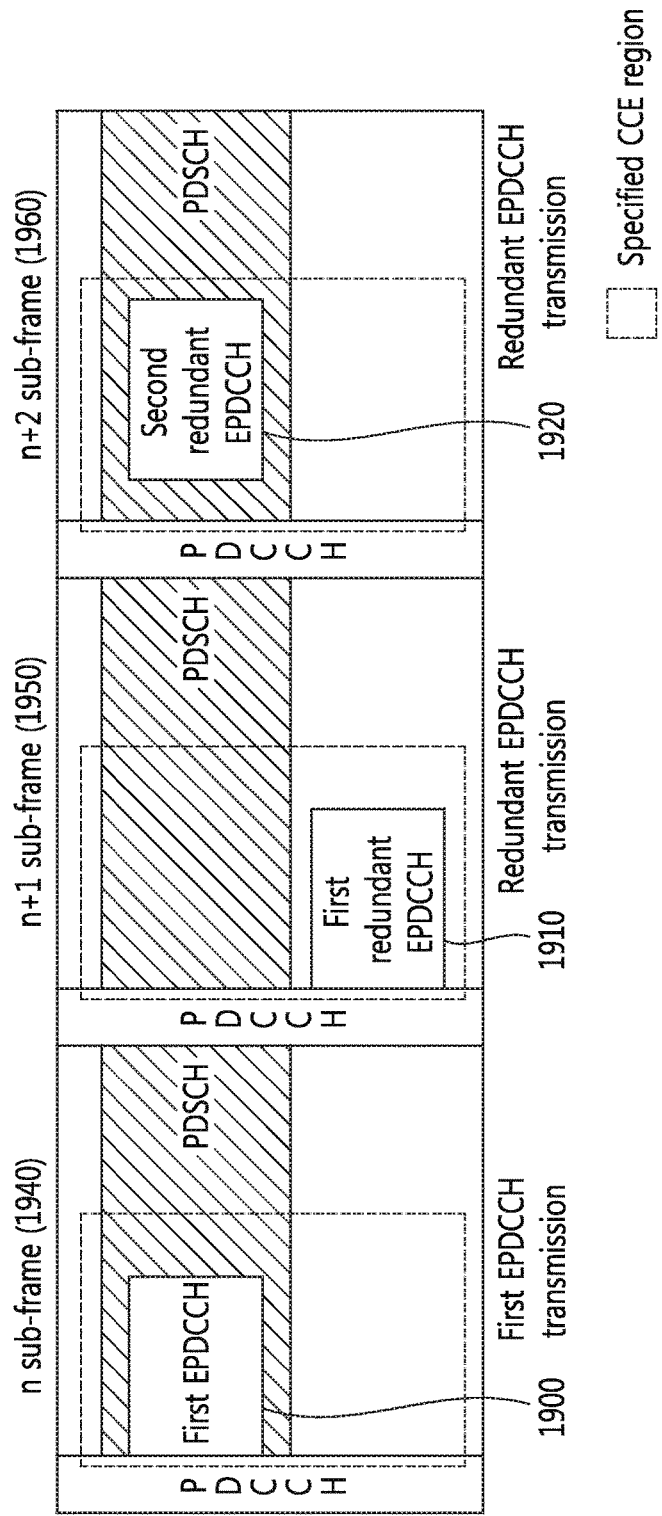
FIG. 19 is a concept view illustrating a configuration of a control channel upon downlink repetition transmission according to an embodiment of the disclosure.

FIG. 19 is a concept view illustrating a configuration of a control channel upon downlink repetition transmission according to an embodiment of the disclosure.

FIG. 19 illustrates a method of positioning a first (E)PDCCH 1900 and redundant (E)PDCCHs 1910 and 1920 at the same CCE in a plurality of sub-frames. For example, a specific resource region (e.g., CCEs 0-7) may be used for the first (E)PDCCH 1900 and the redundant (E)PDCCHs 1910 and 1920 repetitively transmitted. The terminal may perform blind decoding in the specific CCE region to transmit the first (E)PDCCH 1900 and the redundant (E)PDCCHs 1910 and 1920 while conducting blind decoding in the other region, thus increasing the efficiency of blind decoding.

Referring to FIG. 19, in case 3 is used as a redundant value, the first EPDCCH 1900, the first redundant EPDCCH 1910, and the second redundant EPDCCH 1920 may be transmitted through the nth sub-frame 1940 to the n+2th sub-frame 1960. The first EPDCCH 1900, the first redundant EPDCCH 1910, and the second redundant EPDCCH 1920 may be transmitted only in a predetermined CCE region, and the terminal may conduct blind decoding only on the predetermined CCE region to receive the first EPDCCH 1900, the first redundant EPDCCH 1910, and the second redundant EPDCCH 1920.

According to an embodiment of the disclosure, when configuring the control channel upon downlink repetitive transmission, the transmission may be carried out, with the CCE aggregation level limited to a specific level.

Figure 20:
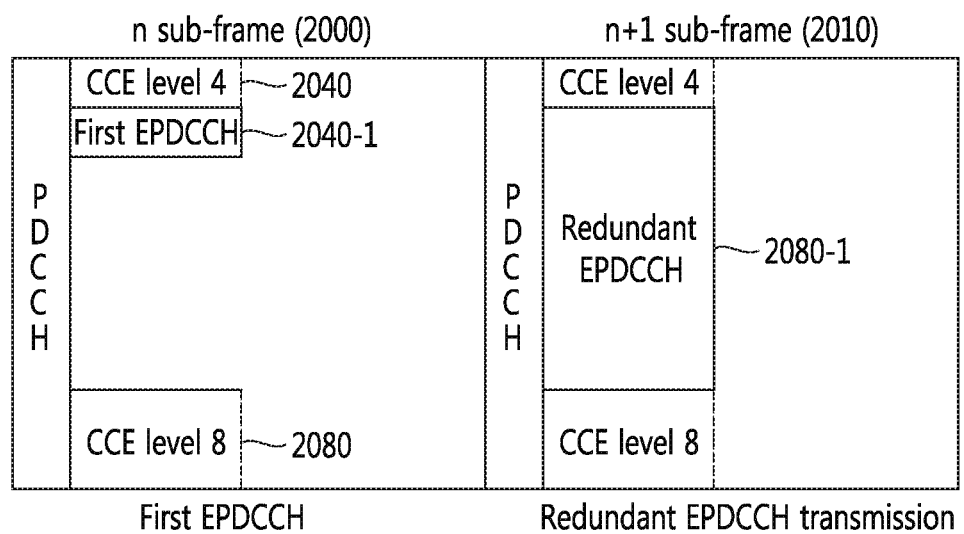
FIG. 20 is a concept view illustrating a method of configuring a control channel upon downlink repetition transmission according to an embodiment of the disclosure.

FIG. 20 is a concept view illustrating a method of configuring a control channel upon downlink repetition transmission according to an embodiment of the disclosure.

As shown in FIG. 20, (E)PDCCHs may be repetitively transmitted with the CCE aggregation level limited. For example, the repetitive transmission of (E)PDCCHs may be applied to the maximum CCE aggregation level or may be conducted using a predetermined one or more CCE aggregation levels only. The CCE aggregation level available for repetitive transmission of (E)PDCCHs may be fixed, transmitted to the terminal through RRC signaling, or broadcast to the terminal through an SIB.

Referring to FIG. 20, blind decoding on (E)PDCCHs repetitively transmitted may be conducted using only CCE aggregation level 4 2040 and CCE aggregation level 8 2080.

Assuming that redundant level is 2, blind decoding may be conducted based on CCE aggregation level 4 2040 and CCE aggregation level 8 2080 in the nth sub-frame 2000, so that the first EPDCCH 2040-1 may be received at the CCE of CCE aggregation level 4.

Blind decoding may be conducted based on CCE aggregation level 4 2040 and CCE aggregation level 8 also in the n+1th sub-frame 2010, so that the redundant EPDCCH 2080-1 of CCE aggregation level 8 may be received.

The €PDCCH repetitive transmission techniques described above in connection with FIGS. 17 to 20 may apply in units of (E)PDCCH sets. The (E)PDCCH set may be a set of a plurality of (E)PDCCHs. The (E)PDCCHs included in the same (E)PDCCH set in a plurality of sub-frames may be bundled. One or more rules of those described above in connection with FIGS. 17 to 20 may be additively applied to the (E)PDCCHs included in the (E)PDCCH set. The information (e.g., CCE aggregation level, DCI candidate index) for performing the EPDCCH repetitive transmission techniques described above in connection with FIGS. 17 to 20 may be transmitted to the terminal through a higher layer or the base station or may be a predetermined value.

According to an embodiment of the disclosure, the code rate may be reduced so that the PRB transmits a transport block with a size smaller than 16. 16 is the minimum TBS (transport block size) currently adopted in LTE systems. For example, in case NPRB is 1 as shown in the following Table 14, an eight-bit TBS may be transmitted.

TABLE 14

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| *0* | *8* | *16* | *32* | *56* | *88* | *120* | *152* | *176* | *208* | *224* |
| 1 | 16 | 32 | 56 | 88 | 120 | 152 | 176 | 208 | 224 | 256 |
| 2 | 24 | 56 | 88 | 144 | 176 | 208 | 224 | 256 | 328 | 344 |
| 3 | 32 | 72 | 144 | 176 | 208 | 256 | 296 | 328 | 376 | 424 |
| 4 | 40 | 104 | 176 | 208 | 256 | 328 | 392 | 440 | 504 | 568 |

TABLE 14-continued

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 5 | 56 | 120 | 208 | 256 | 328 | 408 | 488 | 552 | 632 | 696 |
| 6 | 72 | 144 | 224 | 328 | 424 | 504 | 600 | 680 | 776 | 872 |
| 7 | 328 | 176 | 256 | 392 | 504 | 600 | 712 | 808 | 936 | 1032 |
| 8 | 104 | 224 | 328 | 472 | 584 | 712 | 840 | 968 | 1096 | 1224 |
| 9 | 120 | 256 | 392 | 536 | 680 | 808 | 968 | 1096 | 1256 | 1384 |
| 10 | 136 | 296 | 456 | 616 | 776 | 936 | 1096 | 1256 | 1416 | 1544 |
| 11 | 144 | 328 | 504 | 680 | 872 | 1032 | 1224 | 1384 | 1544 | 1736 |
| 12 | 176 | 376 | 584 | 776 | 1000 | 1192 | 1384 | 1608 | 1800 | 2024 |
| 13 | 208 | 440 | 680 | 904 | 1128 | 1352 | 1608 | 1800 | 2024 | 2280 |
| 14 | 224 | 488 | 744 | 1000 | 1256 | 1544 | 1800 | 2024 | 2280 | 2536 |
| 15 | 256 | 552 | 840 | 1128 | 1416 | 1736 | 1992 | 2280 | 2600 | 2856 |
| 16 | 280 | 600 | 904 | 1224 | 1544 | 1800 | 2152 | 2472 | 2728 | 3112 |
| 17 | 328 | 632 | 968 | 1288 | 1608 | 1928 | 2280 | 2600 | 2984 | 3240 |
| 18 | 336 | 696 | 1064 | 1416 | 1800 | 2152 | 2536 | 2856 | 3240 | 3624 |
| 19 | 376 | 776 | 1160 | 1544 | 1992 | 2344 | 2792 | 3112 | 3624 | 4008 |
| 20 | 408 | 840 | 1288 | 1736 | 2152 | 2600 | 2984 | 3496 | 3880 | 4264 |
| 21 | 440 | 904 | 1384 | 1864 | 2344 | 2792 | 3240 | 3752 | 4136 | 4584 |
| 22 | 488 | 1000 | 1480 | 1992 | 2472 | 2984 | 3496 | 4008 | 4584 | 4968 |
| 23 | 520 | 1064 | 1608 | 2152 | 2664 | 3240 | 3752 | 4264 | 4776 | 5352 |
| 24 | 552 | 1128 | 1736 | 2280 | 2856 | 3496 | 4008 | 4584 | 5160 | 5736 |
| 25 | 584 | 1192 | 1800 | 2408 | 2984 | 3624 | 4264 | 4968 | 5544 | 5992 |
| 26 | 616 | 1256 | 1864 | 2536 | 3112 | 3752 | 4392 | 5160 | 5736 | 6200 |
| ~~~~ | ~~712~~ | ~~1480~~ | ~~2216~~ | ~~2984~~ | ~~3752~~ | ~~4392~~ | ~~5160~~ | ~~5992~~ | ~~6712~~ | ~~7480~~ |

Another method for reducing the transport block size per PRB is to use scaling factors. For example, in case the terminal is an MTC terminal, 'c' (e.g., 0.5) may be used as scaling factor to determine the transport block size as follows:

(1) The terminal may first receive the five-bit modulation and coding method field (IMCS) included in the DCI in order to determine the transport block size and modulation order of data transmitted through the PDSCH.

(2) Next, in case the terminal's DCI CRC is scrambled with P-RNTI, RA-RNTI, or SI-RNTI, 1) DCI Format 1A The transport block size may be determined by setting, to N1A/PRB, the NPRB, a column component in Table 7.1.7.2.1-1 set forth in 3GPP TS 36.213 "Evolved Universal Terrestrial Radio Access (E-UTRA); Physical layer procedures," section 7.1.7.2.1 Transport blocks not mapped to two or more layer spatial multiplexing.

N1A/PRB may be calculated based on 3GPP TS 36.212: "Evolved Universal Terrestrial Radio Access (E-UTRA); Multiplexing and channel coding," section 5.3.3.1.3. N1A/PRB may be information on the number of PRBs allocated to DCI format 1A.

2) DCI Format 1C

The transport block size may be determined using Table 7.1.7.2.3-1 set forth in 3GPP TS 36.213 "Evolved Universal Terrestrial Radio Access (E-UTRA); Physical layer procedures," section 7.1.7.2.3 Transport blocks mapped for DCI Format 1.

(3) In case the terminal's DCI CRC is not scrambled with P-RNTI, RA-RNTI, or SI-RNTI, N 'PRB is set to the total number of PRBs allocated based on the procedure defined in 3GPP TS 36.213 Section 7.1.6 "resource allocation."

In case the transport block is transmitted through the DwPTS of the special sub-frame in frame structure type 2, the column indicator in Table 7.1.7.2.1-1 may be set to $N_{PRB}=\max\{\lfloor N_{PRB}' \times 0.75 \rfloor, 1\}$.

In case the transport block is not transmitted through the DwPTS of the special sub-frame in frame structure type 2, the column indicator in Table 7.1.7.2.1-1 may be set to $NPRB=\max\{\lfloor N_{PRB}' \times c \rfloor 1\}$. Here, c is 0.5. 'c' is UE-specific and may be set previously or semi-statically through RRC signaling.

Another method is to determine the transport block size through RRC signaling. The code rate may be reduced depending on characteristics of data transmitted from the terminal, so that the transport block size smaller than 16 may be transmitted in the PRB.

The reference TBS calculation table may be extended to semi-statically adjust the code rate for transport block. It may be possible to vary the start index and the last index of the TBS mapping table from ITBS=0 to ITBS=26.

For example, the TBS mapping table may be determined by TBS_New_Table(i, j)=TBS_Original_Table(i %110, j−110+i). Here, i is a row index, and j is a column index. i=0 to 219, and j=0 to 109(NPRB=1 to 110). TBS_Original_Table may be Table 7.1.7.2.1-1 set forth in 3GPP TS 36.213, section 7.1.7.2.1. The following table 15 shows a new TBS mapping table determined by the above method.

TABLE 15

| I | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 108 | | | 16 | 32 | 56 | 88 | 120 | 152 | 176 | 208 |
| 109 | | 16 | 32 | 56 | 88 | 120 | 152 | 176 | 208 | 224 |
| 110 | 24 | 56 | 88 | 144 | 176 | 208 | 224 | 256 | 328 | 344 |
| 111 | 32 | 72 | 144 | 176 | 208 | 256 | 296 | 328 | 376 | 424 |
| 112 | 40 | 104 | 176 | 208 | 256 | 328 | 392 | 440 | 504 | 568 |

Referring to Fig. Table 15, in case the row index is '0' and NPRB is not 110 in the TBS mapping table, there is no identified TBS. In such case, the TBS may be assumed to be 16.

The base station may signal the terminal for the first index and the last index used by the terminal in the TBS mapping table. Or, an index set mapped to MCS values may be signaled to the terminal.

For example, a total of thirteen MCS values may be assumed to be allocated to the MTS terminal. In this case, the overall 16 MCS values are set through four bits of DCI format 0, and the three MCS values may be used for re-transmission.

Thirteen MCS values and the corresponding TBS index (ITBS) values may be set in the terminal through RRC signaling. For example, thirteen MCS values and TBS indexes {100, 105, 110, 115, 120, 125, 130, 135, 140, 145, 150, 160} may be mapped and used to calculate the transport block size.

Such method of configuring different types of mapping between the MCSs and the TBS indexes may apply to channels and signals transmitted through downlink channels. The terminal may determine the transport block size based on different TBS mapping tables for the common search space and the UE-specific search space in order to the cell-specific broadcast data.

Further, according to an embodiment of the disclosure, the MCS for data transmitted from the terminal or the base station may be limited. Typically, in case BPSK is used as modulation scheme, even when the channel is not in good condition, the same bit error rate may be obtained as compared with when QPSK is used as modulation scheme. In other words, the coverage obtained when BPSK is used as modulation scheme may be larger than the coverage obtained when QPSK is used as modulation scheme. Accordingly, according to an embodiment of the disclosure, the terminal's coverage may be broaden by limiting the terminal's modulation scheme to BPSK. Use of such method may simplify the structure of the terminal.

Assuming that the terminal supports only BPSK, the MCS indexes 11 to 28 shown in Table 9 are MCS indexes for other modulation scheme than BPSK, and thus, they might not be necessary for the terminal. In such case, for example, the four bits of the MCS field in the DCI format may be used to generate a new MCS table used when the terminal transmits the PUSCH. The following Table 16 shows modulation of PUSCH for MTC terminal, TBS indexes, and redundant versions.

TABLE 16

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | | reserved | |
| 12 | | | |
| 13 | | reserved | 1 |
| 14 | | | 2 |
| 15 | | | 3 |

In Table 16, the redundancy version is used upon re-transmission, and other redundancy versions of transport blocks may be transmitted for each re-transmission in the same transport block, thus increasing error restoration efficiency. Use of such method may change the DCI format MCS field from five bits to four bits. The remaining one bit may be reserved. The base station may adaptively select an MCS depending on whether the terminal receiving the downlink data uses a specific modulation scheme (e.g., BPSK) and the base station may transmit the same to the terminal through a control channel.

Further, according to an embodiment of the disclosure, the terminal may allocate a multiple of the number of RBs necessary for performing PUSCH data transmission and transmit uplink data to the base station, thus increasing frequency diversity.

For example, it may be assumed that the terminal may need a resource of 2RB in order to transmit PUSCH data. According to an embodiment of the disclosure, in such case, the base station may allocate an uplink resource corresponding to e*2RB to the terminal. e is a scaling factor for scaling the uplink resource allocated from the base station to the terminal. For example, in case e=3, the base station may allocate an uplink resource of 6RB to the terminal. The terminal may use the uplink resource (PUSCH resource) allocated by the base station to transmit the PUSCH in the following way:

(1) Rate matching: The rate matching method may repetitively map the PUSCH data to the overall uplink resource allocated by the base station based on the scaling factor and transmit the same.

Figure 21:
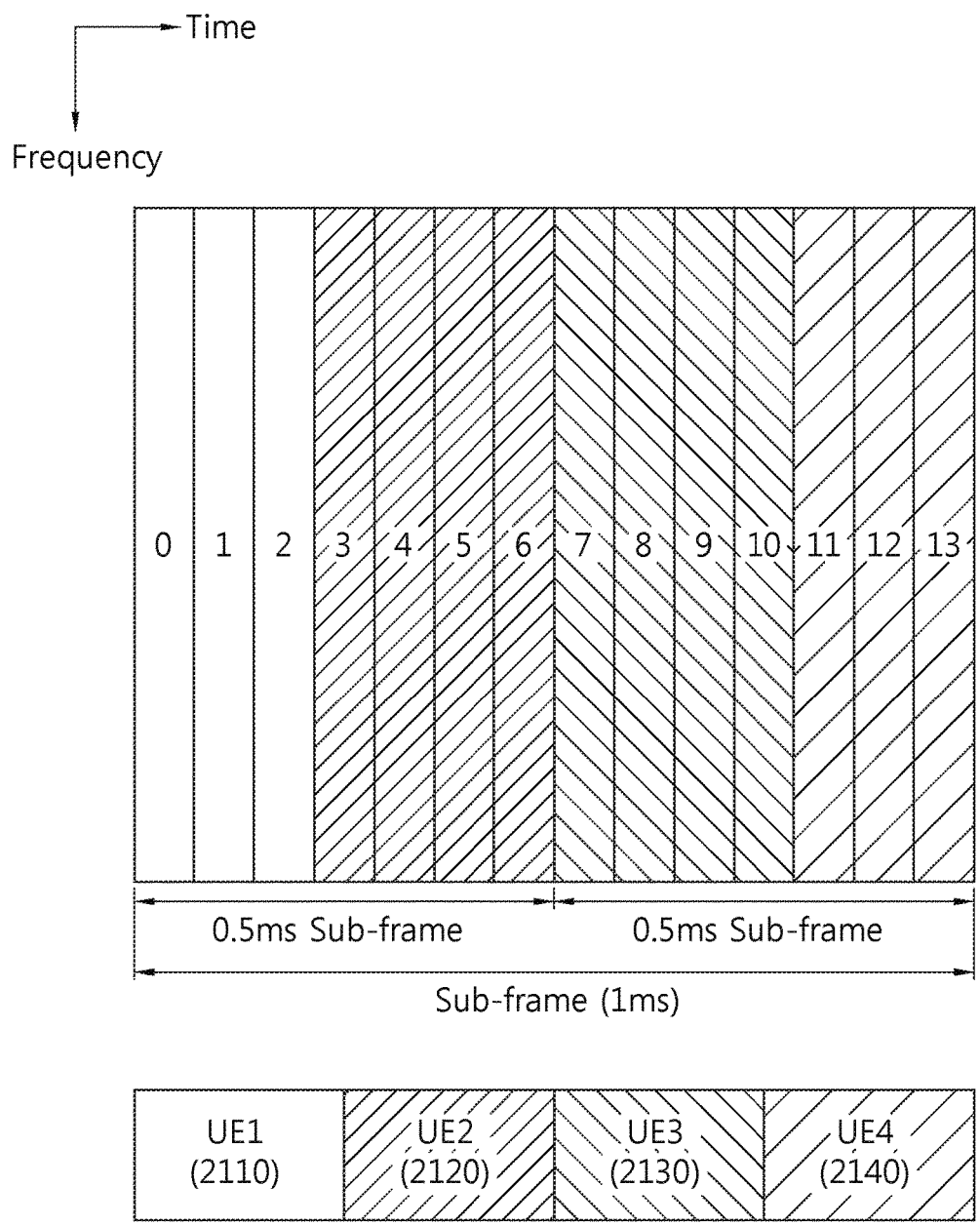
FIG. 21 is a concept view illustrating a method of transmitting uplink data through TDM between a plurality of terminals according to an embodiment of the disclosure.

(2) TDM (time division multiplexing) between a plurality of terminals:

FIG. 21 is a concept view illustrating a method of transmitting uplink data through TDM between a plurality of terminals according to an embodiment of the disclosure.

Referring to FIG. 21, a plurality of terminals 2110, 2120, 2130, and 2140 may conduct uplink transmission through the same PUSCH resource allocated by the base station in the TDM scheme. The plurality of terminals 2110, 2120, 2130, and 2140 each may divide the allocated PUSCH resource according to times, and the terminals 2110, 2120, 2130, and 2140 may their respective uplink data based on the allocated resource. Each of the terminals 2110, 2120, 2130, and 2140 may need to receive information on the "start" and "end" of the OFDM symbol used for uplink transmission.

Or, each of the terminals 2110, 2120, 2130, and 2140 may determine the information on the "start" and "end" of the OFDM symbol based on the received parameter. For example, each of the terminals 2110, 2120, 2130, and 2140 may use both 'e' and ndm_rs, a cyclic shift parameter of reference signal used for demodulating PUSCH in order to determine the start and end of the OFDM symbol. The cyclic shift parameter of reference signal may be transmitted by a higher layer or DCI.

For example, it may be assumed that the number of OFDM symbols available by each of the terminals 2110,

2120, 2130, and 2140 is set to 3 and that scaling factor e is preset to 4. Assuming that the terminal uses OFDM symbols i to j for uplink transmission, i and j may be determined as follows: i=ndm_rs (cyclic shift of reference signal)×e, and j=ndm_rs*e+number of available OFDM symbols=1.

(3) FDM between a plurality of terminals

Figure 22:
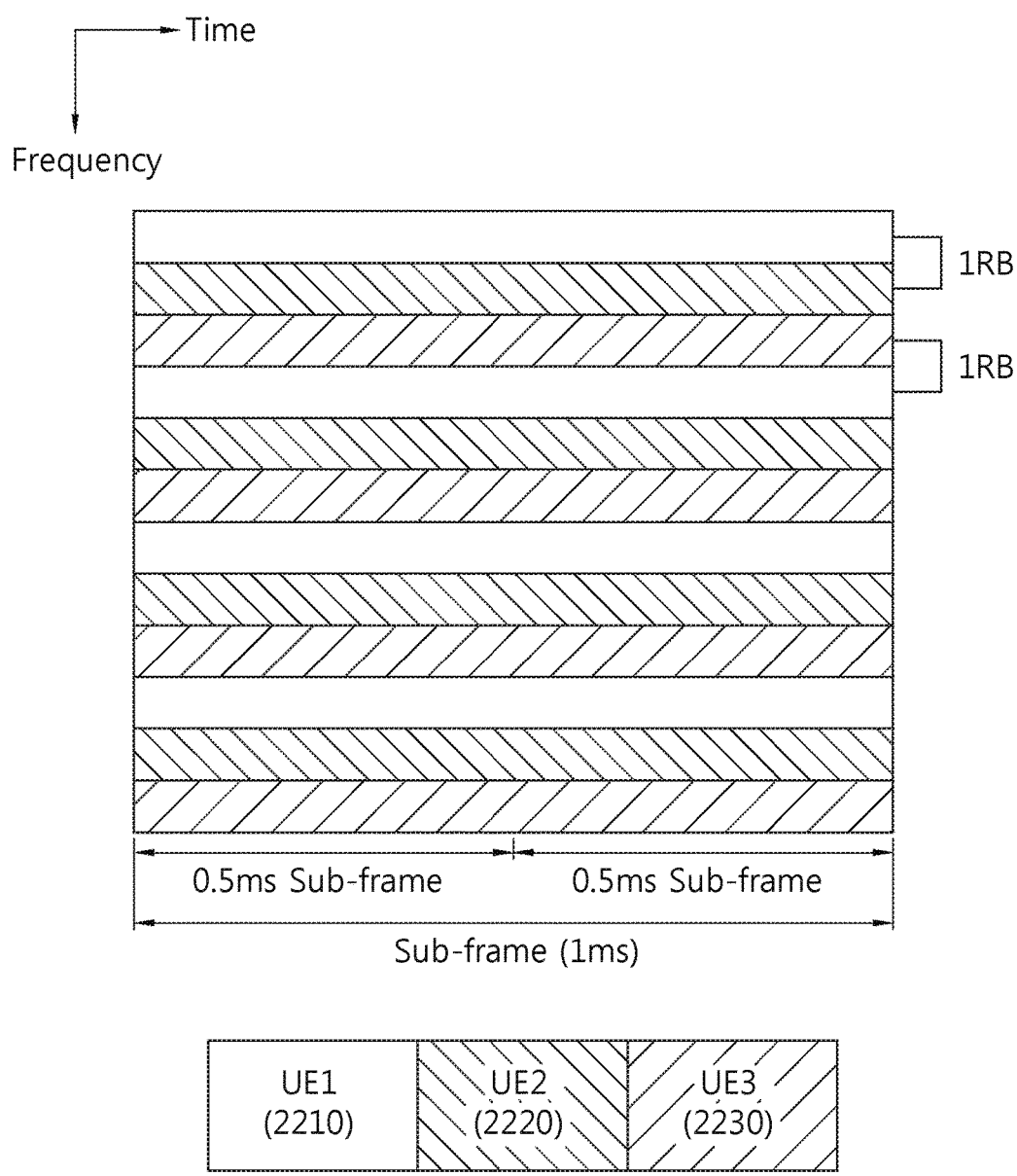
FIG. 22 is a concept view illustrating a method of transmitting uplink data through FDM between a plurality of terminals according to an embodiment of the disclosure.

FIG. 22 is a concept view illustrating a method of transmitting uplink data through FDM between a plurality of terminals according to an embodiment of the disclosure.

Referring to FIG. 22, a plurality of terminals 2210, 2220, and 2230 may share the same PUSCH resource allocated by the base station based on the FDM scheme. The plurality of terminals 2210, 2220, and 2230 sharing the PUSCH resource may be previously grouped by the base station. For example, it may be assumed that six RBs indexed 0 to 5 have been allocated as the PUSCH resource for the three terminals (terminal 1 2210, terminal 2 2220, and terminal 3 2230). The resource allocated to each terminal may be 2RBs. In such case, 2RBs may be allocated to each terminal, thus obtaining frequency diversity. The start RB through which each terminal transmits uplink data to perform multiplexing on the plurality of terminals may be determined based on different cyclic shifts of reference signals for demodulating the PUSCH. The hopping gap for performing frequency hopping may be determined based on scaling factor 'e.' For example, the hopping gap may be determined to be ½*e based on the scaling factor so that frequency hopping is conducted every ½RBs.

Use of such method enables allocation of uplink transmission resources granted by the base station to each terminal 2210, 2200, and 2230. Unless the present parameter can be used for estimating the information on the frequency resource allocation for each of the terminals 2210, 2220, and 2230, the start index and end index for the available PUSCH resource may be indicated to the terminal.

Each of the terminals 2210, 2220, and 2230 may position its PUSCH data at the overall PUSCH resource based on the start offset and frequency hopping gap (e.g., e or ½*e depending on hopping granularities). The information on the start offset and frequency hopping gap may be transmitted to the terminals 2210, 2220, and 2230 by various methods. For example, the frequency hopping gap and hopping granularity may be transmitted to the terminals 2210, 2220, and 2230 through higher layer signaling. The start offset and the number of RBs allocated to each terminal may be transmitted from the base station to the terminal through an uplink grant and DCI (e.g., RIV (RBstart) and length of DCI format 0 (L CRBS)).

In order to effectively conduct FDM between the plurality of terminals, only a specific terminal (e.g., an MTC terminal) may be scheduled in one sub-frame. That is, the specific sub-frame may be allocated only to the MTC terminal, but not to legacy terminals. In another method, the legacy terminal and the specific terminal (e.g., MTC terminal) do not share a frequency region, and the PUSCH region for the MTC terminal performing frequency hopping may be constrained in the sub-frame. As another method, the legacy terminal and the MTC terminal sharing the same PUSCH resource may conduct multiplexing based on the cyclic shift of the reference signal for demodulation of the PUSCH.

Figure 23:
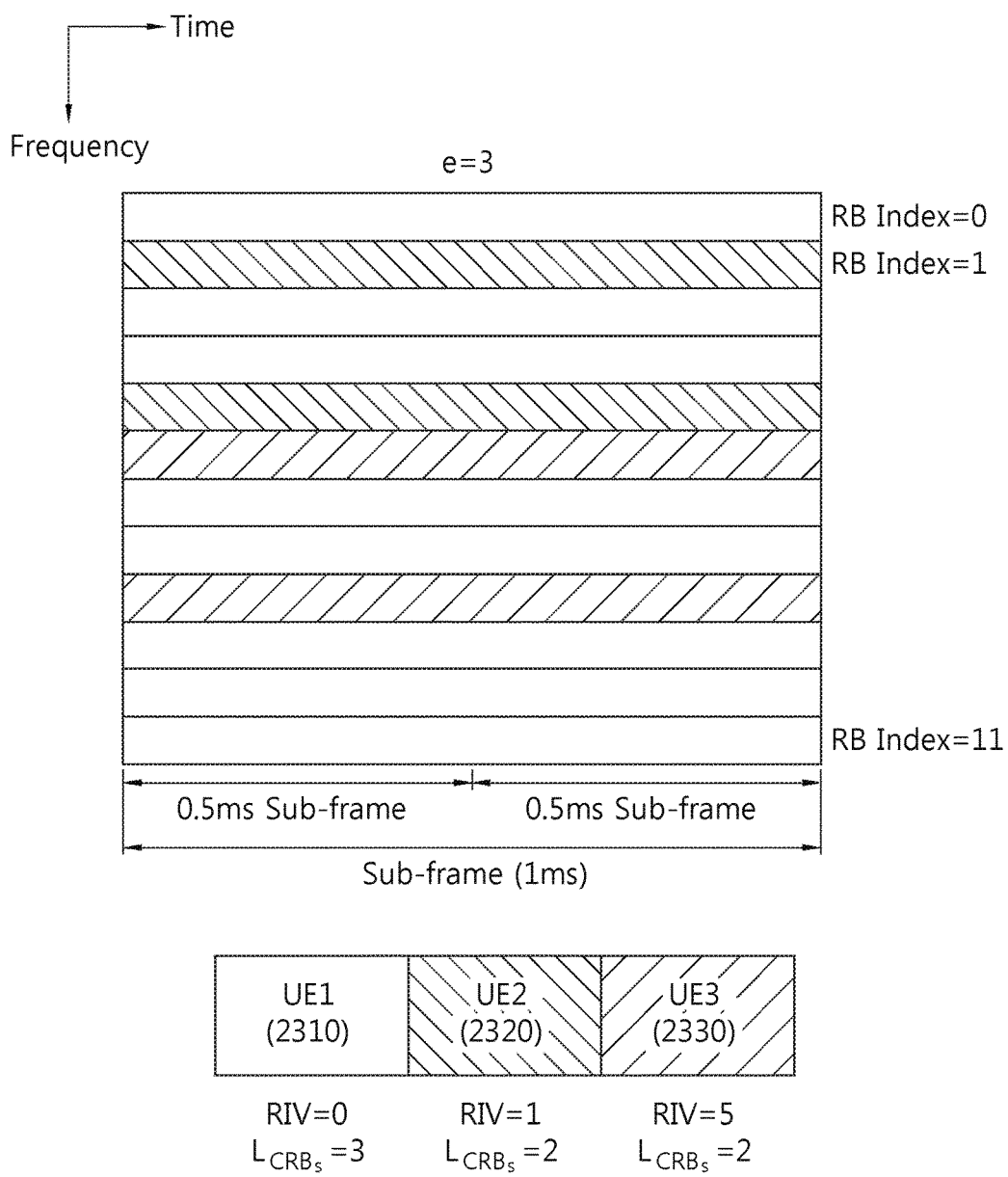
FIG. 23 is a concept view illustrating a method of performing FDM between a plurality of terminals according to an embodiment of the disclosure.

FIG. 23 is a concept view illustrating a method of performing FDM between a plurality of terminals according to an embodiment of the disclosure.

FIG. 23 illustrates an example in which the frequency hopping gap e=3. The RB set allocated to each terminal 2310, 2320, and 2330 may be {RB_RIV % PUSCH_RB_NUM, RB_RIV+e % PUSCH_RB_NUM, ... RB_RIV+e* (LCRBs−1) % PUSCH_RB_NUM}. Here, PUSCH_RB_NUM is the total number of RBs in the overall PUSCH resource region allocated by the base station, RB_RIV the start RB index of the overall PUSCH resource region allocated by the base station, and L CRBS the length of DCI format 0.

Now described is a method of allocating an uplink resource to an MTC terminal per base station. According to an embodiment of the disclosure, one base station may allocate all the uplink resources to one terminal as a method for enhancing the coverage of the terminal particularly positioned at a cell boundary. Use of such method may prevent a terminal transmitting data through an uplink channel from being interfered by other terminal (terminal served by the same base station or by a neighbor base station). Scheduling may address collision/interference between terminals.

Figure 24:
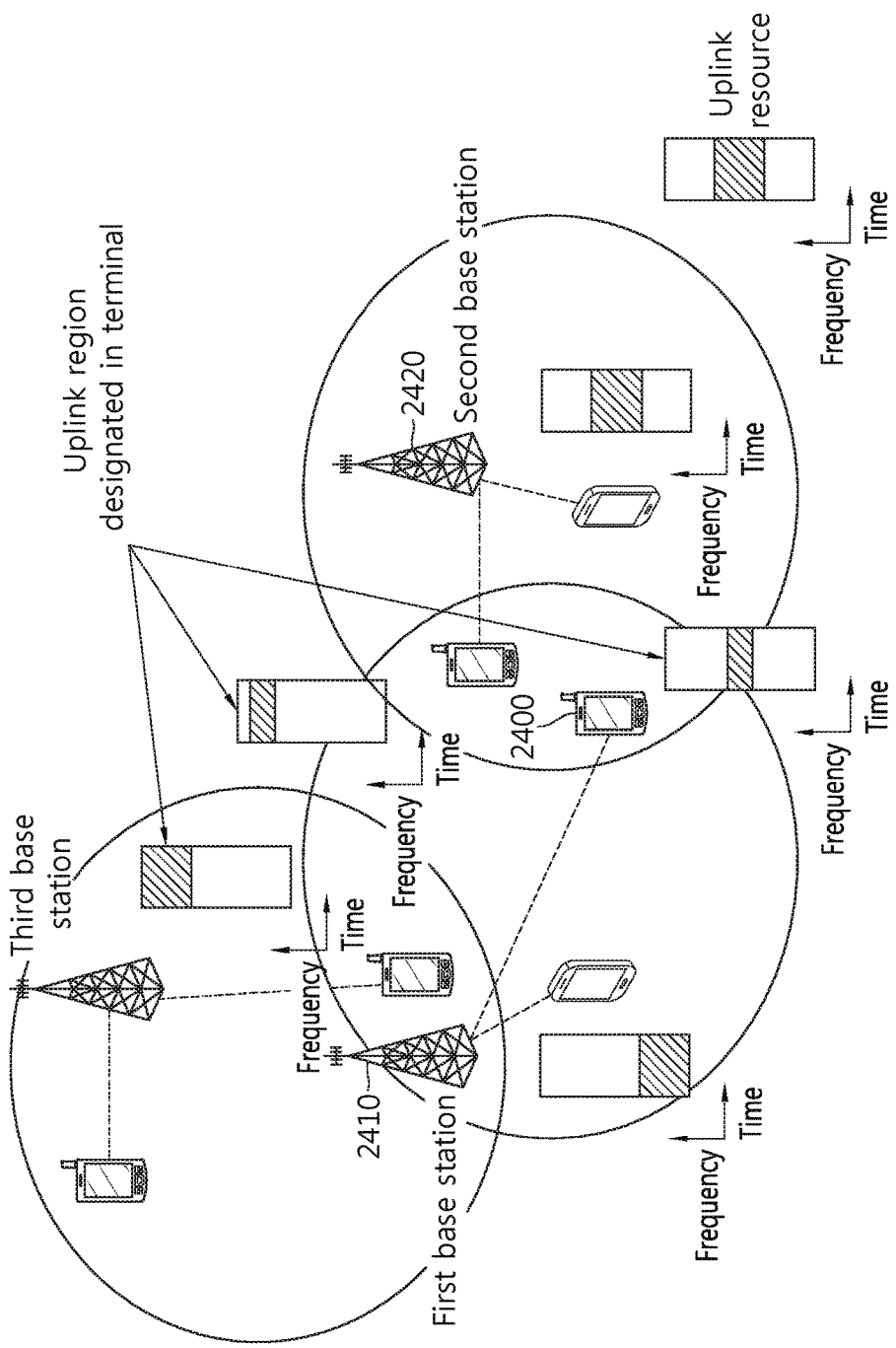
FIG. 24 is a concept view illustrating an FDM-based frequency allocation method according to an embodiment of the disclosure.

FIG. 24 is a concept view illustrating an FDM-based frequency allocation method according to an embodiment of the disclosure.

FIG. 24 illustrates a frequency allocation method based on FDM to prevent inter-cell interference.

Unlike the typical FDM ICIC (inter cell interference coordination), according to an embodiment of the disclosure, each base station may monitor path loss based on the uplink data received from the terminal. Each serving base station may determine a set of neighbor base stations based on the path loss monitored by each base station. The term "neighbor base station" refers to a base station that may interfere with data transmission and reception between the terminal and the serving base station.

For example, referring to FIG. 24, only the second base station 2420 that may interfere with the first terminal 2400 may be a neighbor base station for the first terminal 2400. Accordingly, the PUSCH region for the first terminal 2400 may be set considering the first base station 2410 and the second base station 2420 except the third base station.

The list of terminals served by each base station may be exchanged with the neighbor base station. The neighbor base station may overhear the uplink transmission (SRS, PRACH etc.) transmitted from the terminal served by other base station and may predict a path loss from the terminal served by the other base station. The list of terminals where a path loss predicted based on the value overheard by each base station is more than a predetermined threshold may be reported to the base station serving the terminals. The threshold used to determine the terminals to be reported based on the predicted path loss may be predetermined or varied semi-statically. The terminal with a path loss more than the predetermined threshold may be a terminal present in a region where interference is caused by other base station.

In case there are too many terminals served by the base station, the base station may select only a specific terminal to identify the interference, overhear the uplink data transmitted from the selected terminal, and measure a path loss. In order to determine the terminal's path loss, the location information on each terminal may also be used. Since low-spec terminals cannot sometimes support location information, the uplink transmission data and/or signal, such as SRS and PRACH, transmitted from the terminal may be required for uplink sync and terminal monitoring. Accordingly, uplink transmission may be put in use to measure interference to the terminal from the base station.

The information on the interference measured by the neighbor base station (e.g., path loss value) may be transmitted to the serving base station, and the serving base station may schedule the uplink data transmitted from the terminal based on the received interference information. The serving base station may transmit the information on the PUSCH resource allocated to the terminal to the neighbor base station of the terminal. The neighbor base station may be a base station that may interfere with the terminal.

Further, when receiving the information on the PUSCH resource region allocated to the terminal served by the neighbor base station, the serving base station cannot schedule the PUSCH or PUCCH allocated to the terminal served by the neighbor base station in order to avoid collision. Further, transmission resources may be configured based on TDM between the serving base station and the base station causing interference in the same resource, as well as based on FDM.

In case interference to terminal at the cell boundary is at issue, for the terminal that is positioned close to the serving base station and is thus relatively less interfered, the PUSCH or PUCCH may be allocated to the same resource as the uplink resource allocated to the neighbor base station, and for the terminal that is positioned at the cell boundary and is thus relatively more interfered, the PUCCH and/or PUSCH may be scheduled based on the resource allocated to the serving base station.

The above-described technique may be applicable not just to uplink channels but also to downlink channels such as control and data channels. For example, the serving base station may determine a downlink channel for transmitting downlink data to the terminal based on the interference information calculated by the neighbor base station. The serving base station may conduct downlink channel allocation based on the downlink channel allocation information allocated by the neighbor base station to prevent interference to the terminal that operates at the boundary, an interference region.

Figure 25:
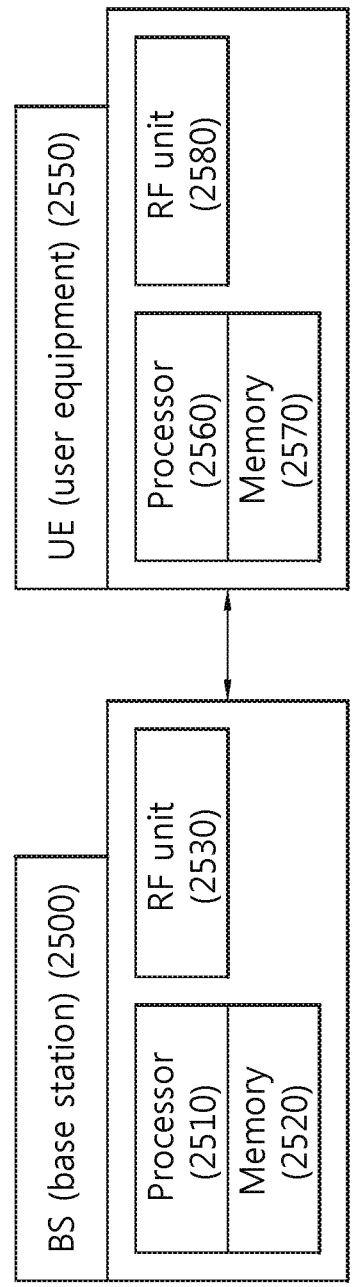
FIG. 25 is a block diagram illustrating a wireless communication system according to an embodiment of the disclosure.

FIG. 25 is a block diagram illustrating a wireless communication system according to an embodiment of the disclosure.

Referring to FIG. 25, the base station 2500 includes a processor 2510, a memory 2520, and an RF (radio frequency) unit 2530. The memory 2520 is connected with the processor 2510 and stores various types of information for driving the processor 2510. The RF unit 2520 is connected with the processor 2510 and communicates radio signals. The processor 2510 implements functions, processes, and/or methods as proposed herein. In the above-described embodiments, the operation of the base station may be implemented by the processor 2510.

For example, the processor 2510 may transmit, to the terminal, a plurality of control channels including the same control data according to configurations. The processor may transmit information on a repetitive transmission count, redundant information, to the terminal.

The wireless device 2550 includes a processor 2560, a memory 2570, and an RF (Radio Frequency) unit 2580. The memory 2570 is connected with the processor 2560 and stores various types of information for driving the processor 2560. The RF unit 2580 is connected with the processor 2560 and communicates radio signals. The processor 2560 implements functions, processes, and/or methods as proposed herein. In the above-described embodiments, the operation of the wireless device may be implemented by the processor 2560.

For example, the processor 2560 may be implemented to receive redundant information of a first control channel from the base station, to receive a first sub-frame from the base station, to perform first blind decoding on the first sub-frame, and to monitor the first control channel. The redundant information may contain information on the number of times in which the base station repetitively transmits the first control channel.

Further, the processor 2560 may be implemented to receive a second sub-frame from the base station, to perform second blind decoding on the second sub-frame based on the information obtained by performing the first blind decoding and the received redundant information, and to monitor the second control channel. Here, the data transmitted in the second control channel may include the same data as the data transmitted in the first control channel.

The processor may include an ASIC (application-specific integrated circuit), other chipset, a logic circuit, and/or a data processing device. The memory may include a ROM (Read-Only Memory), a RAM (Random Access Memory), a flash memory, a memory card, a storage medium, and/or other storage device. The RF unit may include a baseband circuit for processing radio signals. When an embodiment is implemented in software, the above-described schemes may be embodied in modules (processes, or functions, etc.) performing the above-described functions. The modules may be stored in the memory and executed by the processor. The memory may be positioned in or outside the processor and may be connected with the processor via various well-known means.

In the above-described example system, the methods are described based on the flowcharts with a series of steps or blocks, but the disclosure is not limited to the order of the steps, and rather, some steps may be performed simultaneously or in different order with other steps. It should be appreciated by one of ordinary skill in the art that the steps in the flowcharts do not exclude each other and that other steps may be added to the flowcharts or some of the steps may be deleted from the flowcharts without influencing the scope of the disclosure.

What is claimed is:

1. A method of receiving a downlink control channel in a wireless communication system, the method performed by a user equipment (UE) and comprising:
   receiving a radio resource control (RRC) signal including first information from a base station (BS); and
   performing blind decoding in a plurality of downlink sub-frames over which downlink control information (DCI) is repeated,
   wherein the first information indicates a repetition number of the DCI over the plurality of downlink sub-frames,
   wherein the DCI includes second information related to a repetition number of a physical uplink shared channel (PUSCH), and
   wherein the DCI further includes a modulation and coding scheme (MCS) field indicating a MCS index value of a maximum of 10 for the UE.

2. The method of claim 1, further comprising transmitting the PUSCH repeated over a plurality of uplink subframes based on the second information.

3. The method of claim 1, wherein performing the blind decoding comprises:
   performing first blind decoding on a first downlink sub-frame among the plurality of downlink sub-frames; and
   performing second blind decoding on a second downlink sub-frame among the plurality of downlink sub-frames.

4. The method of claim 3, further comprising determining a control channel element (CCE) aggregation level for transmitting a downlink control channel,
   wherein the second blind decoding is performed based on the CCE aggregation level.

5. The method of claim 3, further comprising determining a first control channel element (CCE) region in the first downlink sub-frame,
  wherein the second blind decoding is performed on a second CCE region of the second downlink sub-frame, the second CCE region indicating a same resource allocation region as the first CCE region.

6. A user equipment (UE) receiving a downlink control channel in a wireless communication system, the UE comprising:
  a radio frequency (RF) unit configured to receive information; and
  a processor configured to:
  receive a radio resource control (RRC) signal including first information from a base station (BS); and
  perform blind decoding in a plurality of downlink sub-frames over which downlink control information (DCI) is repeated,
  wherein the first information indicates a repetition number of the DCI over the plurality of downlink sub-frames,
  wherein the DCI includes second information related to a repetition number of a physical uplink shared channel (PUSCH), and
  wherein the DCI further includes a modulation and coding scheme (MCS) field indicating a MCS index value of a maximum of 10 for the UE.

7. The UE of claim 6, wherein the processor is further configured to transmit the PUSCH repeated over a plurality of uplink subframes based on the second information.

8. The UE of claim 6, wherein performing the blind decoding comprises:
  performing first blind decoding on a first downlink sub-frame among the plurality of downlink sub-frames; and
  performing second blind decoding on a second downlink sub-frame among the plurality of downlink sub-frames.

9. The UE of claim 6, wherein:
  the processor is further configured to determine a control channel element (CCE) aggregation level for transmitting the downlink control channels; and
  the second blind decoding is performed based on the CCE aggregation level.

10. The UE of claim 6, wherein:
  the processor is further configured to determine a first control channel element (CCE) region in the first downlink sub-frame; and
  the second blind decoding is performed on a second CCE region of the second downlink sub-frame, the second CCE region indicating a same resource allocation region as the first CCE region.

* * * * *